US006636817B2

(12) United States Patent
Fioravanti

(10) Patent No.: US 6,636,817 B2
(45) Date of Patent: Oct. 21, 2003

(54) METHOD AND APPARATUS FOR ENHANCED MECHANICAL SIGNATURE ANALYSIS

(75) Inventor: Louis John Fioravanti, Boulder, CO (US)

(73) Assignee: Seagate Technology LLC, Scotts Valley, CA (US)

(*) Notice: Subject to any disclaimer, the term of this patent is extended or adjusted under 35 U.S.C. 154(b) by 163 days.

(21) Appl. No.: 09/876,453

(22) Filed: Jun. 7, 2001

(65) Prior Publication Data

US 2002/0038188 A1 Mar. 28, 2002

Related U.S. Application Data

(60) Provisional application No. 60/233,893, filed on Sep. 20, 2000.

(51) Int. Cl.[7] .............................................. G01R 23/02
(52) U.S. Cl. ........................................... 702/75; 360/25
(58) Field of Search ............................. 702/75, 76, 77, 702/79, 33, 34, 35, 38, 66, 67, 69, 70, 73, 182, 183, 190, 199; 360/29, 30, 6, 25; 324/207.13, 210, 211, 212, 213, 500, 528, 772, 612, 76.19, 76.21

(56) References Cited

U.S. PATENT DOCUMENTS

| 3,758,758 | A |   | 9/1973  | Games et al. ............. 235/151.3 |
| 4,559,600 | A | * | 12/1985 | Rao ............................ 700/175 |
| 4,939,599 | A |   | 7/1990  | Chainer et al. ........... 360/77.03 |
| 5,247,448 | A |   | 9/1993  | Liu ............................. 364/468 |
| 5,251,151 | A |   | 10/1993 | Demjanenko et al. ...... 364/550 |
| 5,504,571 | A |   | 4/1996  | Eckerman et al. ......... 356/28.5 |
| 5,629,870 | A | * | 5/1997  | Farag et al. ................ 700/286 |
| 5,654,841 | A | * | 8/1997  | Hobson et al. ............... 360/75 |
| 5,663,894 | A |   | 9/1997  | Seth et al. .................. 364/508 |
| 5,804,726 | A |   | 9/1998  | Geib et al. .................... 73/593 |
| 5,847,658 | A |   | 12/1998 | Irie et al. .................... 340/683 |
| 5,917,428 | A |   | 6/1999  | Discenzo et al. ...... 340/870.01 |
| 6,069,764 | A |   | 5/2000  | Morris et al. ............. 360/77.04 |
| 6,222,336 | B1| * | 4/2001  | McKenzie et al. .......... 318/448 |
| 6,249,392 | B1| * | 6/2001  | Sacks et al. .................. 360/31 |

* cited by examiner

Primary Examiner—Marc S. Hoff
Assistant Examiner—Edward Raymond
(74) Attorney, Agent, or Firm—Merchant & Gould P.C.

(57) ABSTRACT

A mechanical signature analysis system for analyzing frequencies and magnitudes of vibrations in an operating test disc drive includes a test data acquisition module connected to the test disc drive to acquire time domain test data and convert it into frequency domain test data, a typical disc drive data module having frequency domain data for a typical disc drive, and a failure analysis module having failure limits associated with the typical disc drive frequency domain data to determine whether the test data are within the failure limits. An output module displays failure analysis results. A method of determining a typical disc drive frequency used in analyzing vibrations in a test disc drive includes calculating a theoretical disc drive frequency that is a function of electromechanical characteristics of a class of disc drives, searching a configuration file of typical disc drive frequency data, and identifying in the configuration file a peak magnitude within a predetermined range of frequencies around the theoretical frequency.

31 Claims, 17 Drawing Sheets

METHOD AND APPARATUS FOR ENHANCED MECHANICAL SIGNATURE ANALYSIS

RELATED APPLICATIONS

This application claims priority of U.S. provisional application Serial No. 60/233,893, filed Sep. 20, 2000.

FIELD OF THE INVENTION

This application relates generally to disc drives and more particularly to an enhancing mechanical frequency signature analysis.

BACKGROUND OF THE INVENTION

It is well known that vibration of parts in a disc drive can have long-term undesirable effects on the disc drive, and reduce the time until failure. In an ideal disc drive, no vibration would be produced. In practice, however, vibration occurs as a normal by-product of the interaction of mechanical forces within the disc drive. A good disc drive design is one that produces low levels of inherent vibration. Subsequent increases in vibration level indicate a change in the dynamic characteristics of the machine, often caused by a defect or deterioration of moving parts.

Modern technology has greatly simplified and improved upon vibration monitoring techniques. Sensitive accelerometers can be used in sensing vibration, and complex electronics have evolved to process the vibration data. One method of vibration analysis is "Vibration Signature Analysis," which is most often accomplished in the frequency domain. Under this method, time-domain vibration data are converted to the frequency domain using a Fourier Transform. The unique frequency spectrum obtained is often termed the "signature" of the disc drive. A signature of a disc drive under test may be analyzed and compared to a signature for a reference disc drive. Differences in the two spectra may indicate an abnormal condition.

A common problem associated with most of the prior art monitoring equipment is that they usually require a human operator to analyze and compare the signatures. Prior art inventions lack the sophisticated electronic circuitry and data processing necessary for automatic comparison of the spectra and for rendering a decision regarding the condition of the disc drive under test, with only minimal human interface. Prior art inventions are also generally incapable of distinguishing between ball bearing frequencies and electromagnetic frequencies. Prior art inventions are not capable of identifying sources of vibration without having the disc drive disassembled to attach a transducer directly to an element that is thought to be a source of vibration. Frequently, a disc drive and its subassemblies are disassembled only to find out that the alleged source of vibration is not the source at all, resulting in wasted time and parts. Prior art devices are also incapable of extracting events, or specific sections of interest in a typical vibration signal. Still other prior art devices do not maintain a large file of historical and theoretical frequency information for properly functioning disc drives that can be used to compare with a test disc drive. Finally, prior art devices do not provide a user interface on which a set of useful real-time statistics and pass/fail information is displayed.

Accordingly there is a need for a method and apparatus that provides a non-invasive analysis capable of characterizing different vibrations.

SUMMARY OF THE INVENTION

Against this backdrop the present invention has been developed. One embodiment of the present invention involves an apparatus which allows for analyzing vibrations in a disc drive, without the need for opening the disc drive and applying a transducer directly to internal components, thereby avoiding the destruction of the disc drive and the waste associated therewith. Another embodiment of the present invention involves an apparatus for analyzing vibrations in a disc drive by comparing test frequency data to similar data for a reference disc drive. Another embodiment of the present invention involves locating typical frequencies and their associated magnitudes in a configuration database of reference disc drive frequency data by initially calculating theoretical frequencies based on the electromechanical characteristics of a test disc drive.

Embodiments of the invention may be implemented as a computer process, a computing system or as an article of manufacture such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process.

These and various other features as well as advantages which characterize embodiments of the present invention will be apparent from a reading of the following detailed description and a review of the associated drawings.

DETAILED DESCRIPTION

Figure 1:
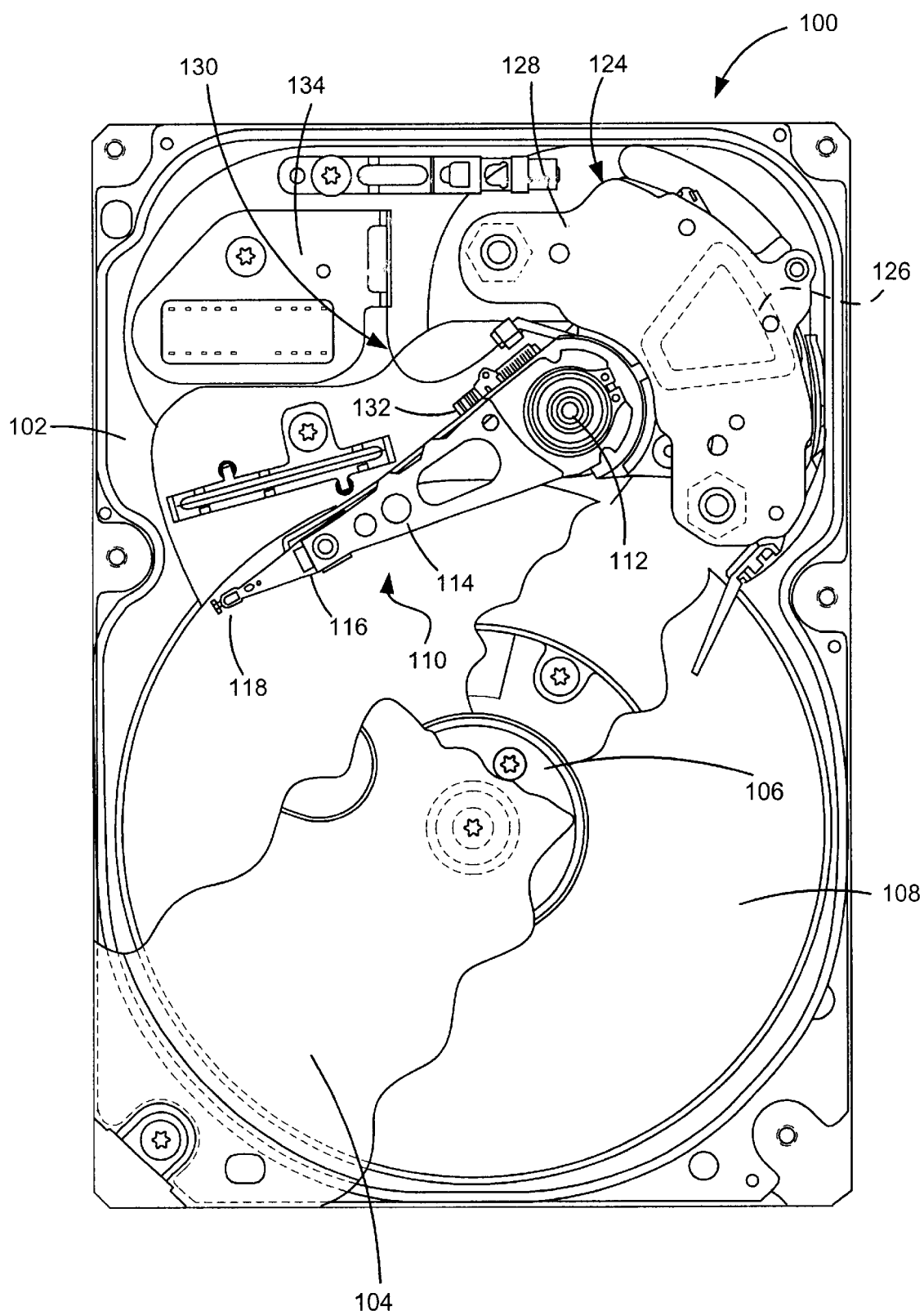
FIG. 1 is a plan view of a disc drive incorporating a preferred embodiment of the present invention showing the primary internal components.

The invention is described in detail below with reference to the drawing figures. When referring to the figures, like structures and elements shown throughout are indicated with like reference numerals.

A disc drive 100 constructed in accordance with a preferred embodiment of the present invention is shown in FIG.

1. The disc drive 100 includes a base 102 to which various components of the disc drive 100 are mounted. A top cover 104, shown partially cut away, cooperates with the base 102 to form an internal, sealed environment for the disc drive in a conventional manner. The components include a spindle motor 106, which rotates one or more discs 108 at a constant high speed. Information is written to and read from tracks on the discs 108 through the use of an actuator assembly 110, which rotates during a seek operation about a bearing shaft assembly 112 positioned adjacent the discs 108. The actuator assembly 110 includes a plurality of actuator arms 114 which extend towards the discs 108, with one or more flexures 116 extending from each of the actuator arms 114. Mounted at the distal end of each of the flexures 116 is a head 118, which includes an air bearing slider, enabling the head 118 to fly in close proximity above the corresponding surface of the associated disc 108.

During a seek operation, the track position of the heads 118 is controlled through the use of a voice coil motor (VCM) 124, which typically includes a coil 126 attached to the actuator assembly 110, as well as one or more permanent magnets 128 which establish a magnetic field in which the coil 126 is immersed. The controlled application of current to the coil 126 causes magnetic interaction between the permanent magnets 128 and the coil 126 so that the coil 126 moves in accordance with the well-known Lorentz relationship. As the coil 126 moves, the actuator assembly 110 pivots about the bearing shaft assembly 112, and the heads 118 are caused to move across the surfaces of the discs 108.

The spindle motor 106 is typically de-energized when the disc drive 100 is not in use for extended periods of time. The heads 118 are moved over park zones 120 near the inner diameter of the discs 108 when the drive motor is de-energized. The heads 118 are secured over the park zones 120 through the use of an actuator latch arrangement, which prevents inadvertent rotation of the actuator assembly 110 when the heads are parked.

A flex assembly 130 provides the requisite electrical connection paths for the actuator assembly 110 while allowing pivotal movement of the actuator assembly 110 during operation. The flex assembly includes a printed circuit board 132 to which head wires (not shown) are connected; the head wires being routed along the actuator arms 114 and the flexures 116 to the heads 118. The printed circuit board 132 typically includes circuitry for controlling the write currents applied to the heads 118 during a write operation and a preamplifier for amplifying read signals generated by the heads 118 during a read operation. The flex assembly terminates at a flex bracket 134 for communication through the base deck 102 to a disc drive printed circuit board (not shown) mounted to the bottom side of the disc drive 100.

Figure 2:
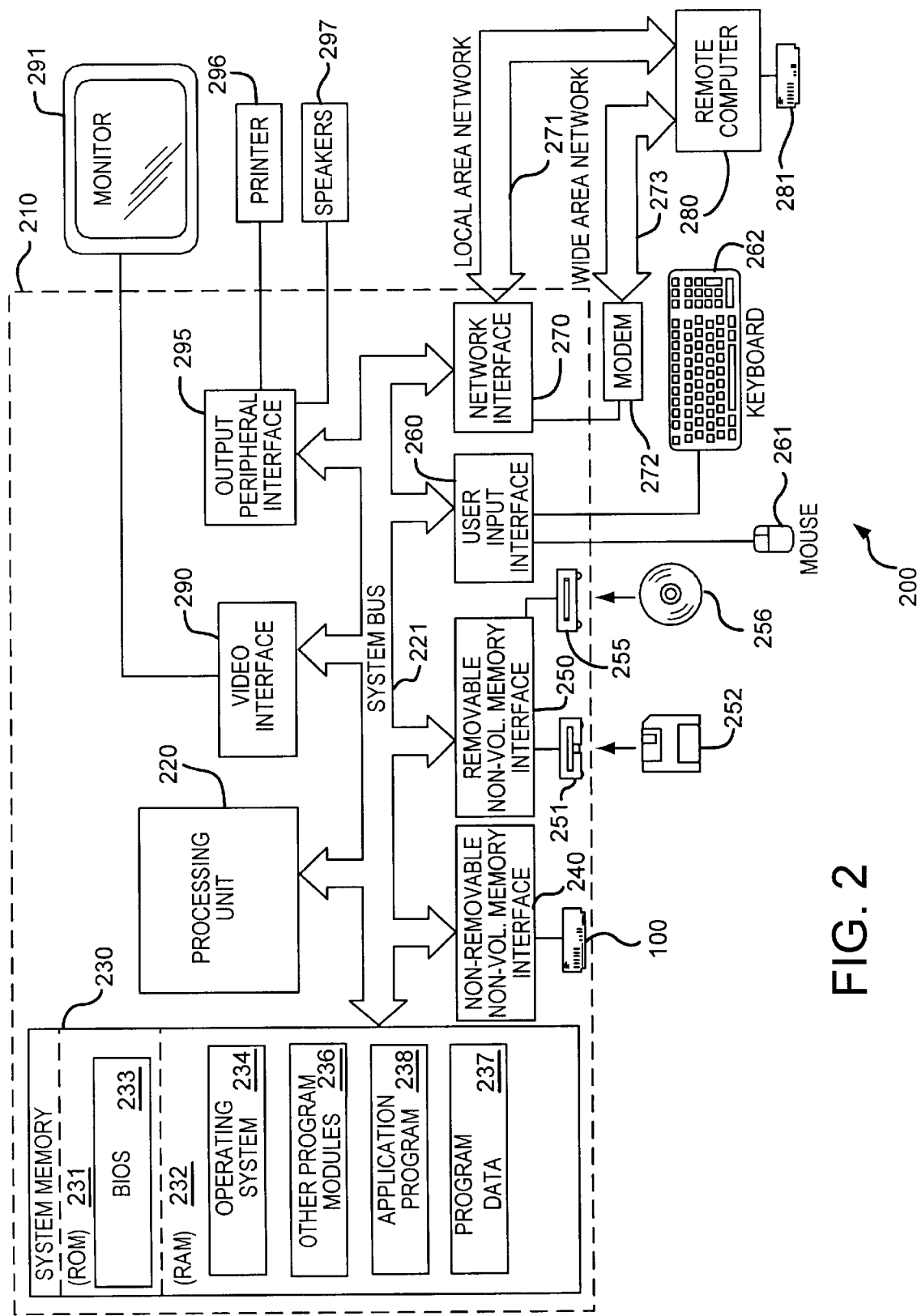
FIG. 2 illustrates a suitable computing system environment for use in implementing an embodiment of the present invention.

FIG. 2 illustrates an example of a suitable computing system environment 200 on which embodiments of the invention may be implemented. The computing system environment 200 is only one example of a suitable computing environment and is not intended to suggest any limitation as to the scope of use or functionality of the numerous embodiments of the invention. Neither should the computing environment 200 be interpreted as having any dependency or requirement relating to any one or combination of components illustrated in the exemplary operating environment 200.

Embodiments of the invention are operational with numerous other general purpose or special purpose computing system environments or configurations. Examples of well known computing systems, environments, and/or configurations that may be suitable for use with embodiments of the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

Embodiments of the invention may be described in the general context of computer-executable instructions, such as program modules, being executed by a computer. Generally, program modules include routines, programs, objects, components, data structures, etc. that perform particular tasks or implement particular abstract data types. Embodiments of the invention may also be practiced in distributed computing environments where tasks are performed by remote processing devices that are linked through a communications network. In a distributed computing environment, program modules may be located in both local and remote computer storage media including memory storage devices.

With reference to FIG. 2, an exemplary system for implementing an embodiments of the invention includes a general purpose computing device in the form of a computer 210. Components of computer 210 may include, but are not limited to, a processing unit 220, a system memory 230, and a system bus 221 that couples various system components including the system memory 230 to the processing unit 220. The system bus 221 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 210 typically includes a variety of computer readable media. Computer readable media can be any available media that can be accessed by computer 210 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile discs (DVD) or other optical disc storage, magnetic cassettes, magnetic tape, magnetic disc storage or other magnetic storage devices, or any other medium which can be used to store the desired information and which can accessed by computer 210. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared and other wireless media. Combinations of any of the above should also be included within the scope of computer readable media.

The system memory 230 includes computer storage media in the form of volatile and/or nonvolatile memory such as read only memory (ROM) 231 and random access memory (RAM) 232. A basic input/output system 233 (BIOS), containing the basic routines that help to transfer information between elements within computer 210, such as during start-up, is typically stored in ROM 231. RAM 232 typically contains data and/or program modules that are immediately accessible to and/or presently being operated on by processing unit 220. By way of example, and not limitation, FIG. 2 illustrates operating system 234, application program 238, other program modules 236, and program data 237.

The computer 210 may also include other removable/non-removable, volatile/nonvolatile computer storage media. By way of example only, FIG. 2 illustrates a hard disc drive 100 that reads from or writes to non-removable, nonvolatile magnetic media, a magnetic disc drive 251 that reads from or writes to a removable, nonvolatile magnetic disc 252, and an optical disc drive 255 that reads from or writes to a removable, nonvolatile optical disc 256 such as a CD ROM or other optical media. Other removable/non-removable, volatile/nonvolatile computer storage media that can be used in the exemplary operating environment include, but are not limited to, magnetic tape cassettes, flash memory cards, digital versatile discs, digital video tape, solid state RAM, solid state ROM, and the like. The hard disc drive 100 is typically connected to the system bus 221 through a non-removable memory interface such as interface 240, and magnetic disc drive 251 and optical disc drive 255 are typically connected to the system bus 221 by a removable memory interface, such as interface 250.

A user may enter commands and information into the computer 210 through input devices such as a keyboard 262 and pointing device 261, commonly referred to as a mouse, trackball or touch pad. Other input devices (not shown) may include a microphone, joystick, game pad, satellite dish, scanner, or the like. These and other input devices are often connected to the processing unit 220 through a user input interface 260 that is coupled to the system bus, but may be connected by other interface and bus structures, such as a parallel port, game port or a universal serial bus (USB). A monitor 291 or other type of display device is also connected to the system bus 221 via an interface, such as a video interface 290. In addition to the monitor 291, computers may also include other peripheral output devices such as speakers 297 and printer 296, which may be connected through a output peripheral interface 295.

The computer 210 may operate in a networked environment using logical connections to one or more remote computers, such as a remote computer 280. The remote computer 280 may be a personal computer, a server, a router, a network PC, a peer device or other common network node, and typically includes many or all of the elements described above relative to the computer 210, although only a memory storage device 281 has been illustrated in FIG. 2. The logical connections depicted in FIG. 2 include a local area network (LAN) 271 and a wide area network (WAN) 273, but may also include other networks. Such networking environments are commonplace in offices, enterprise-wide computer networks, intranets and the Internet.

When used in a LAN networking environment, the computer 210 is connected to the LAN 271 through a network interface or adapter 270. When used in a WAN networking environment, the computer 210 typically includes a modem 272 or other means for establishing communications over the WAN 273, such as the Internet. The modem 272, which may be internal or external, may be connected to the system bus 221 via the user input interface 260, or other appropriate mechanism. In a networked environment, program modules depicted relative to the computer 210, or portions thereof, may be stored in the remote memory storage device. It will be appreciated that the network connections shown are exemplary and other means of establishing a communications link between the computers may be used.

Although many other internal components of the computer 210 are not shown, those of ordinary skill in the art will appreciate that such components and the interconnection are well known. Accordingly, additional details concerning the internal construction of the computer 210 need not be disclosed in connection with the present invention.

Figure 3:
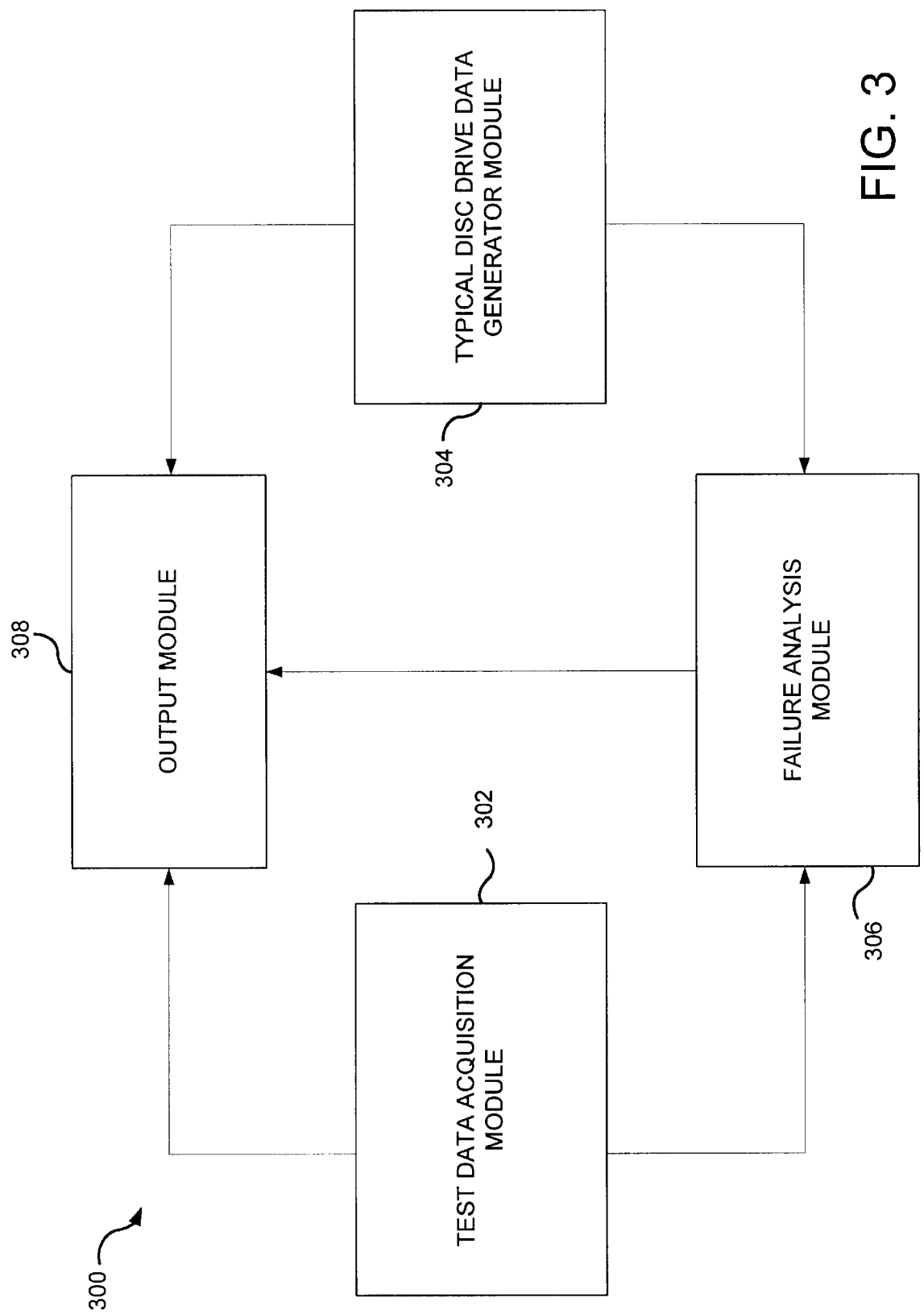
FIG. 3 illustrates modules of a mechanical signature analysis system in accordance with a preferred embodiment of the present invention.

Referring now to FIG. 3, therein is shown a diagram illustrating modules of a mechanical signature analysis system in accordance with a preferred embodiment of the present invention. Shown in FIG. 3 is a mechanical signature analysis system 300 that analyzes the frequencies and magnitudes of vibrations in a device being tested, and generates a pass or fail indicator. The mechanical signature analysis system 300 of FIG. 3 is comprised of four exemplary modules, a test data acquisition module 302, a typical disc drive data generator module 304, a failure analysis module 306, and an output module 308. The modules of FIG. 3 are connected to each other and operate to acquire test vibration data, provide characteristic, or typical, disc drive data, analyze the tested vibration data, and display test results. In the embodiment of FIG. 3, there is no particular order in which each system performs its associated processing. Typically, test data is acquired by test data acquisition module 302, and the typical disc drive data generator module 304 provides characteristic disc drive data, before the failure analysis module 306 performs analysis. The output module 308 can either output data as it is acquired and provided, or it can wait to output all data after all the data is acquired, provided, and analyzed.

The test data acquisition module 302 typically consists of a computer, such as the computer 210 shown in FIG. 2, connected to a test disc drive, such as the disc drive 100 shown in FIG. 1. The test data acquisition module 302 acquires vibration data from the test disc drive 100 and processes the data in the computer 210. Typically, after the test data is acquired and processed, it is made available to the failure analysis module 306, so that the test data can be analyzed. The test data can be made available to the output module 308 as each unit of test data is acquired or after all of the test data is acquired. The test data acquisition module will be discussed in more detail in reference to the embodiments illustrated in FIGS. 4–7 and FIG. 17.

The typical disc drive data generator module 304 typically consists of a database or configuration file identified by a name of a disc drive class and configuration. The configuration file preferably contains typical disc drive frequency data, such as, but not limited to, characteristic frequencies and associated magnitude data. The typical disc drive data generator module 304 also has processing modules and data that identify frequencies of interest by calculating theoretical frequencies based on disc drive electromechanical characteristics. Typically, after the typical disc drive data is generated, it is made available to the failure analysis module 306, so that it can be used in failure analysis. The typical disc drive data can be made available to the output module 308 as each unit of typical disc drive data is generated or after all of the typical disc drive data is generated. The typical disc drive data generator module 304 will be discussed in more detail in reference to the embodiments illustrated in FIGS. 8–16.

The failure analysis module 306 analyzes acquired test vibration data that is obtained by the test data acquisition module 302, and typical disc drive vibration data that is generated by the typical disc drive data generator module 304. The failure analysis module 306 preferably consists of a failure limits generation module and a determining module that determines whether the acquired test data is within the limits generated. The failure analysis module 306 preferably generates pass/fail results based on a failure analysis. The results are typically made available to the output module 308. The failure analysis module 306 will be discussed in more detail in reference to the embodiments illustrated in FIGS. 8–16.

The output module 308 typically outputs failure analysis results, acquired test data in one or more forms, and typical disc drive data in one or more forms. The output module 308 typically consists of an output device, an output device driver, and output data formatting and processing modules. The output device can be any output device that is able to output computer data including, but not limited to, output devices shown in FIG. 2 such as the monitor 291, the printer 296, a file stored on the hard disc drive 100, and an application program 238, such as a spread sheet program, that is able to accept the data as input. The output module 308 is discussed in more detail throughout the following detailed discussion of the embodiments illustrated herein.

Figure 4:
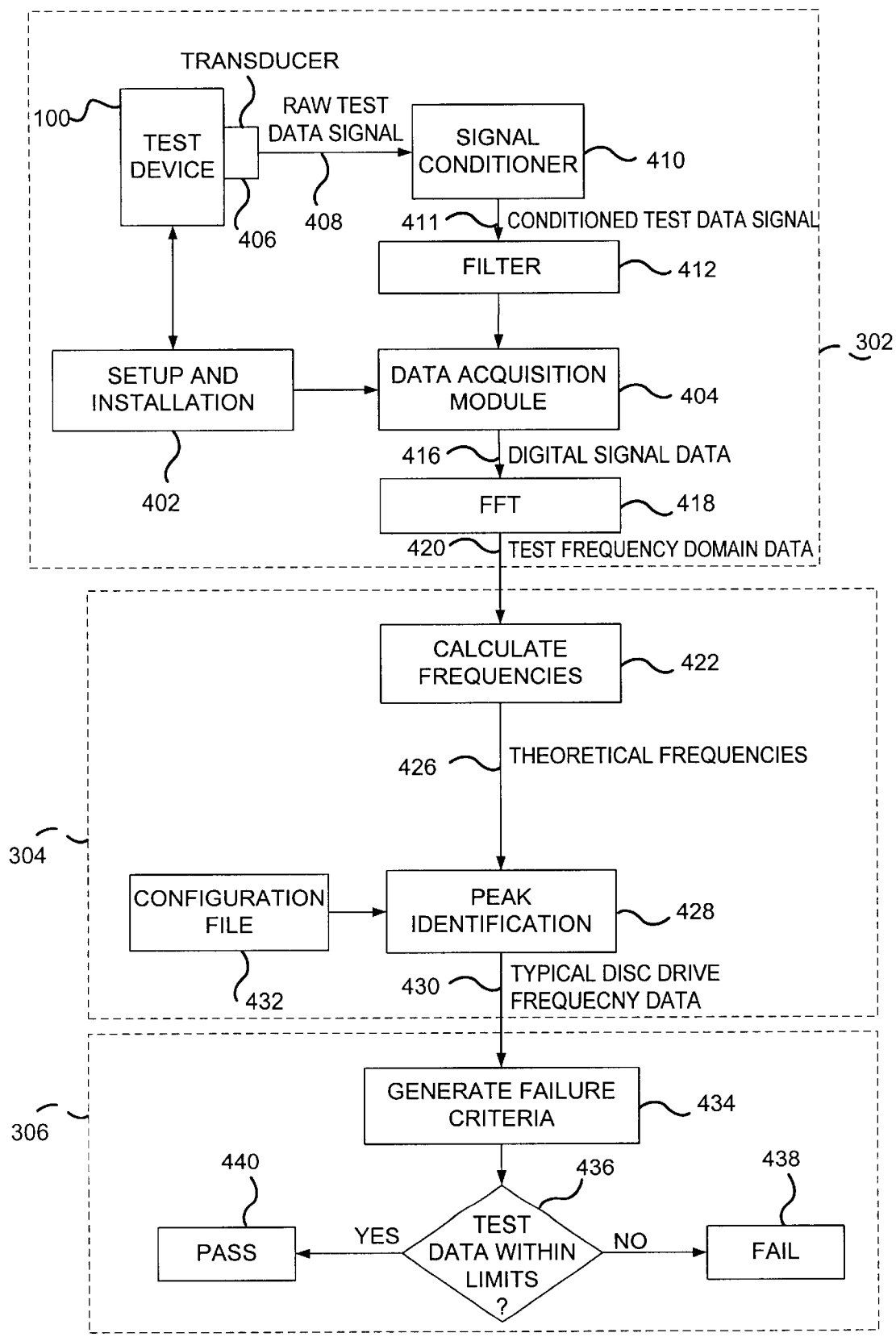
FIG. 4 is a module diagram illustrating operating modules in accordance with a preferred embodiment of the present invention.

FIG. 4 is a module diagram illustrating modules and operations in accordance with a preferred embodiment of the present invention. Each module and operation is illustrated as being comprised by an associated module of FIG. 3. This is for illustration purposes only and each module and operation of FIG. 4 could be associated with a module other than the one it is associated with in the embodiment of FIG. 4. Also, as mentioned earlier, processing in the test data acquisition module 302 can occur before, simultaneously with, or after processing in the typical disc drive data generator module 304. In the exemplary embodiment shown in FIG. 4, the test data acquisition module 302 acquires test data before the typical disc provides typical disc drive data drive data generator module 304.

The test data acquisition module 302 shown in FIG. 4 includes a test device, such as test device 100. The test device 100 typically has disc drive identification data such as a name, model, configuration, and serial number. In this embodiment, the test device 100 communicates with a setup and installation module 402. The setup and installation module 402 communicates with a data acquisition module 404 that is preferably connected to a computer, such as the computer 210 of FIG. 2. The setup and installation module 402 communicates with the test device 100 and receives identification data from the test device 100. The setup and installation module then sends the identification data associated with the test device 100 to the data acquisition module 404.

The test device 100 in the embodiment of FIG. 4 is connected to a transducer 406 that detects vibrations in the test device 100. The transducer 406 is preferably an Endevco 22 accelerometer, but can be any kind of vibration-detecting transducer. Importantly, the transducer 406 is fastened to the outside surface of the test device 100 using any fastening means. Thus, the mechanical signature analysis system analyzes the test device 100 without the need to open up the test device 100 and directly apply the transducer to internal parts. The transducer 406 can be placed at any angle relative to the motor of the test device 100 to obtain a greater or lesser percentage of types of vibrations. The transducer 406 generates a signal, such as the raw test data signal 408 shown in FIG. 4.

The raw test data signal 408 is communicated to a signal conditioner 410 that typically performs filtering and signal amplification. The signal conditioner 410 generates a conditioned signal 411 that is input into a filter 412. The filter 412 is preferably a low pass, anti-aliasing filter. In the preferred embodiment, the low-pass filter passes only frequencies below 25 kilohertz; however, the passband frequency is typically a function of the sampling rate. As is well-known in the art, frequencies greater than half the sampling frequency, if not filtered out, are reflected back into the lower frequencies. Frequencies above half the sampling frequency are unwanted. Thus, in other embodiments with different sampling frequencies, the passband for the filter may be a different frequency. The filter 412 generates a filtered signal that is sent to the data acquisition module 404.

The data acquisition module 404 receives the filtered signal, and converts it to digital signal form, creating digital signal data 416 that the computer 210 can process. The digital signal data 416 is typically stored in memory, such as the floppy disc memory 251, of the computer 210 for later processing. The digital signal data 416 is available to a fast fourier transform (FFT) module 418 that performs a FFT on the digital signal data 416 to create a frequency domain test data signal 420. With the test vibration data in the frequency domain, frequencies of interest can be isolated and analyzed. The process of test data acquisition will be discussed in more detail in reference to the embodiments illustrated in FIGS. 5–7 and FIG. 17.

In the embodiment of FIG. 4, after the test data is acquired, control transfers to the calculate frequencies operation 422 of the typical data generator module 304. The calculate frequencies operation 422 calculates theoretical frequencies 426 at which one would expect to find peak magnitudes based on the electromechanical characteristics of the test device 100. For example, specific diameter, preload, race curvature, and pitch diameter characteristics of the ball bearings, which are known when the test device identification data is known, are associated with theoretical frequencies 426, having peaks in magnitude relative to other frequencies.

Control then transfers to the peak identification operation 428. The peak identification operation 428 uses the theoretical frequencies 426 to generate typical disc drive data 430 by searching a configuration file 432 having typical, or average, frequency and magnitude data for a set of disc drives, of which test device 100 is one. The typical disc drive data 430 includes, but is not limited to, typical disc drive frequencies having associated typical disc drive magnitudes. Importantly, the peak identification operation 428 identifies the magnitudes of typical frequencies that are neither bearing frequencies nor electromagnetic frequencies. Frequencies that are neither bearing nor electromagnetic are called 'other' frequencies and are used to identify frequencies in test data that are neither bearing nor electromagnetic and have a greater magnitude than those of the typical disc drive. For example, a higher than average test magnitude at a test frequency that is neither bearing nor electromagnetic could indicate a system resonance at that frequency or some other vibration that is important for further analysis. The operations and modules of the typical data generator module 304 shown in FIG. 4 will be discussed in more detail in reference to FIGS. 8–16.

After the test data is acquired and the typical disc drive data 430 is generated, control transfers to the generating operation 434 of the failure analysis module 306, as shown in the embodiment of FIG. 4. In the generating operation 434, statistical failure criteria are generated using the typical disc drive data 430. Failure criteria are typically in the form of limits. A limit is preferably in the form of a multiple of standard deviations away from a most likely expected magnitude. Limits typically include a lower limit and an upper limit associated with typical, or average, magnitudes of frequencies associated with a disc drive. Importantly, failure criteria are generated for 'other' frequencies as well as bearing and electromagnetic frequencies so that the entire continuum of test frequencies is analyzed.

After the failure criteria are generated, control transfers to the determining operation 436 wherein it is determined whether the test frequency domain data 420 is within the failure limits. If it is not within the limits, control transfers to the fail operation 438, wherein a failure processing occurs. Failure processing includes, but is not limited to sending a failure indicator to the output module 308. If the test frequency domain data 420 is within the failure limits, control transfers to the pass operation 440 wherein pass processing occurs. Pass processing includes, but is not limited to, sending a pass indicator to the output module 308. The modules and operations shown in the failure analysis module 306 will be described in more detail in reference to FIGS. 19–22.

Figure 5:
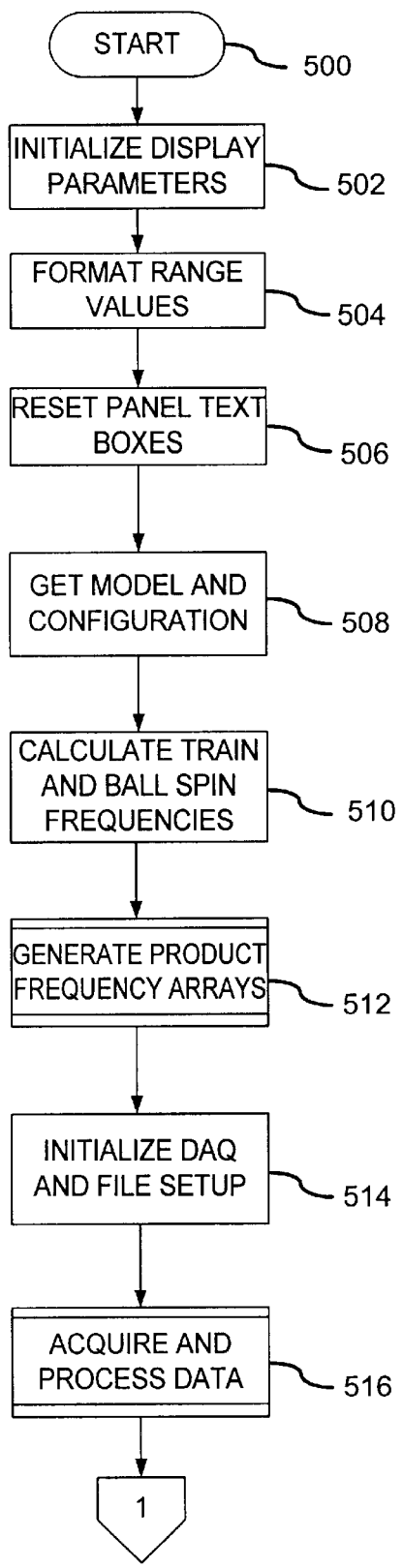
FIGS. 5–7 is a flow chart of the test data gathering and analysis process in accordance with a preferred embodiment of the present invention.
Figure 6:
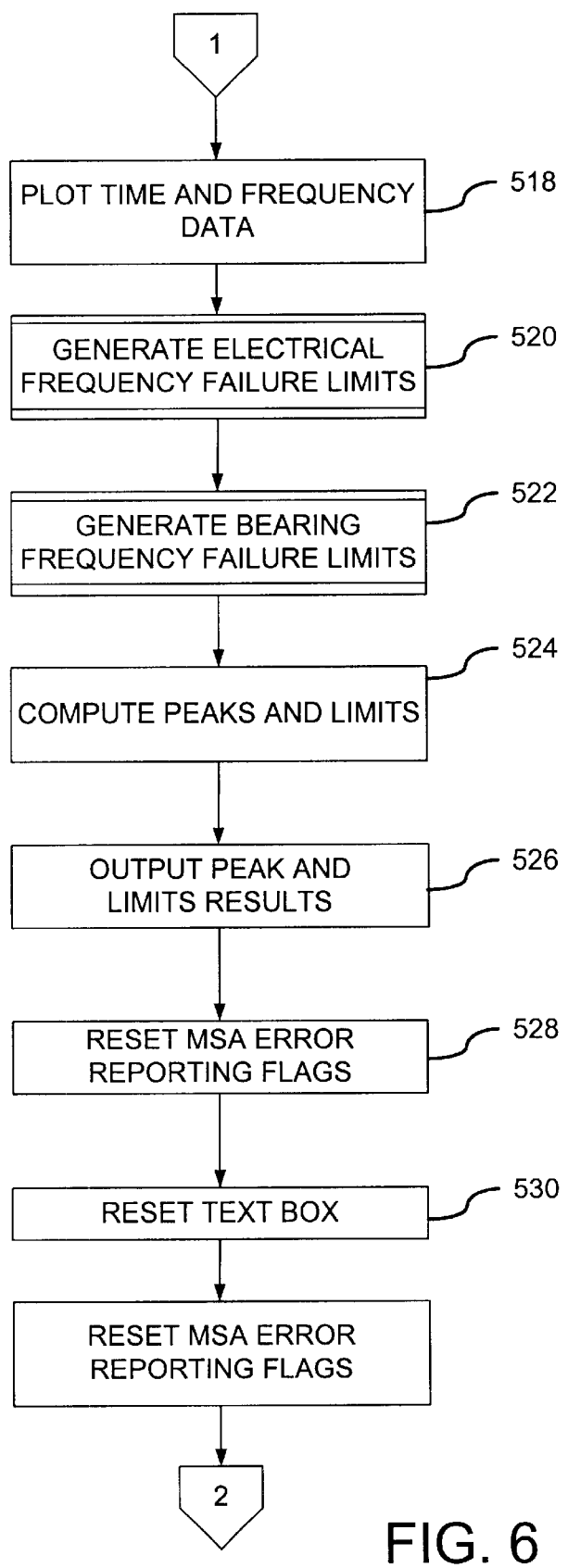
Figure 7:
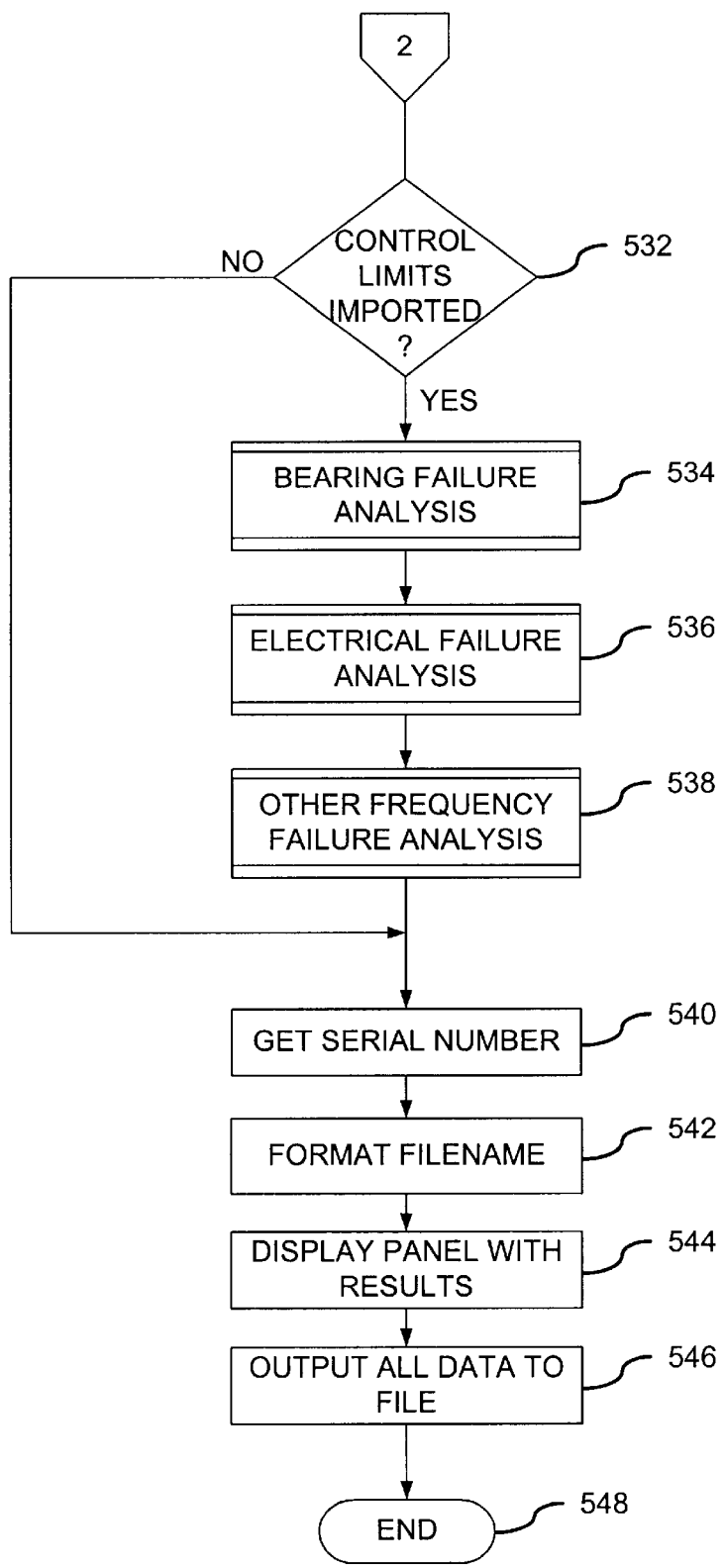

FIGS. 5–7 are a flow chart of the test data acquisition and analysis process in accordance with a preferred embodiment of the present invention. Control initially transfers to the start operation 500 when initializing processing is performed. Control then transfers to initialize operation 502 wherein display parameters are initialized. Control then transfers to the format operation 504 wherein range values for the display are formatted. Control then transfers to the reset operation 506 wherein display panel text boxes are reset.

Control then transfers to the get operation 508 wherein the model and configuration of test device 100 are obtained preferably by the setup and installation module 402. The model and configuration data obtained in operation 508 is then transferred to the data acquisition module 404. Control then transfers to the calculate operation 510 wherein train and ball spin frequencies are calculated. Train, or cage, frequencies and ball spin frequencies are characteristics of the model and configuration of the test device 100. Train and ball spin frequencies are typically calculated by using the fundamental rotational frequency of the inner race and fundamental rotational frequency of the outer race. After the train and ball spin frequencies are calculated, they are used to generate theoretical frequencies of interest. Control then transfers to the generate operation 512 which is preferably a sub-routine call to a sub-routine in which disc drive frequency arrays are generated. The generate operation 512 will be discussed in more detail in reference to the embodiments illustrated in FIGS. 8–16. Control then transfers to the initialize operation 514 in which the data acquisition module is initialized. The initialize operation 514 typically initializes files that will be used to store data that is acquired from the test device 100.

Control then transfers to the acquire operation 516 wherein test device data is acquired and processed. The acquire operation 516 is preferably performed in a separate sub-routine that will be discussed in more detail in reference to the embodiment illustrated in FIGS. 17 & 18. After the test data is acquired control transfers to the plot operation 518 wherein the test data is plotted in the time and frequency domain. Control then transfers to the generate operation 520 wherein electromagnetic frequency failure limits are generated. The generate operation 520 is preferably performed in a separate sub-routine and will be discussed in more detail in reference to the embodiments of FIG. 18. Control then transfers to the generate operation 522 wherein bearing frequency failure limits are generated. The generate operation 522 is preferably performed as a sub-routine call and will be discussed in more detail in reference to the embodiment shown in FIG. 19. Control then transfers to the compute operation 524 wherein frequency magnitude peaks and frequency limits indexes are computed. The frequency magnitude peaks and limits indexes are used in the output of the data. Control then transfers to the output operation 526 wherein the previously calculated frequency magnitude peaks and limits indexes are output.

Control then transfers to the reset operation 528 wherein the mechanical signature analysis error reporting flags are reset in preparation of test data analysis. Control then transfers to the reset operation 530 wherein a text box that is used to output the results of the analysis is reset. Control then transfers to the determining operation 532 wherein it is determined whether control limits are imported. The preferred embodiment includes the determining operation 532 so that the user of the system can bypass the failure analysis. This can be useful in situations where the user does not need a pass/fail result but rather only wants to look at raw data from the test device 100. If control limits are imported control then transfers to the bearing failure analysis operation 534, which will be discussed in more detail in reference to the embodiment shown in FIG. 20. Control then transfers to the electrical failure analysis operation 536 which will be discussed in more detail in reference to the embodiment shown in FIG. 21. Control then transfers to the other frequency failure analysis operation 538 wherein a failure analysis is preferably performed on other frequencies that are not within the set of typical frequencies generated earlier. If control limits are not imported and when other frequencies have been analyzed in the operation 538 control transfers to the get operation 540. In the get operation 540 the serial number of the test device 100 is obtained so that a results file can be associated with the particular test device 100 being tested. Control then transfers to the format operation 542 wherein the file name of the results file is formatted. Control then transfers to the display operation 544 wherein a panel of results is displayed to the user. Control then transfers to the output operation 546 wherein all data acquired, generated and analyzed is output to a file.

Figure 8:
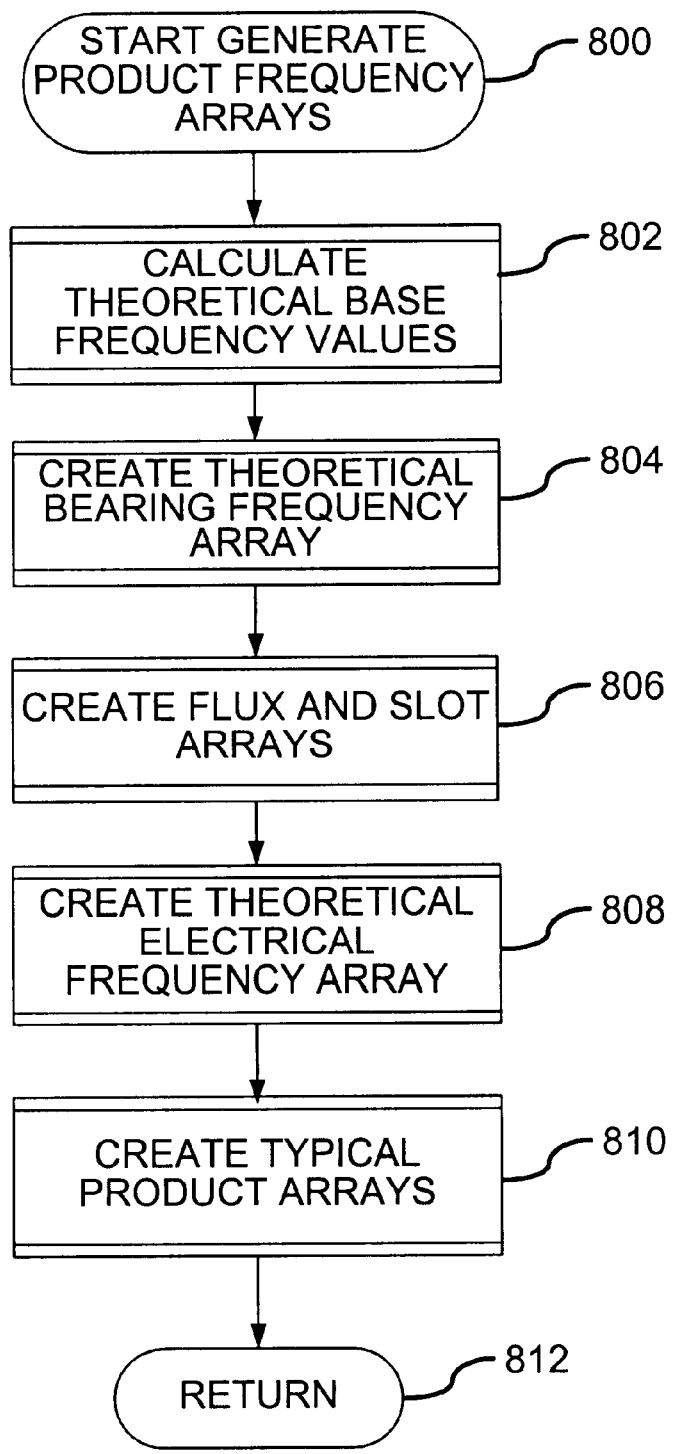
FIGS. 8–14 are flow charts of the typical frequency generation process in accordance with a preferred embodiment of the present invention.

FIGS. 8–16 are flow charts of the typical frequency generation process in accordance with a preferred embodiment of the present invention. Turning now to FIG. 8 therein is shown a high level flow chart illustrating the disc drive array generation process in accordance with the preferred embodiment of the present invention. Disc drive arrays are created using electromagnetic frequency arrays and bearing frequency arrays. Electromagnetic frequency arrays are created using flux and slot arrays. Bearing frequency arrays are generated using typical base frequency values. Referring to FIG. 8, control transfers to the start operation 800 wherein initializing processing takes place. Control then transfers to the calculate operation 802 wherein typical base frequency values are calculated. The calculate operation 802 is preferably in the form of a sub-routine call that will be discussed in more detail in regard to FIG. 9. Control then transfers to the create operation 804 wherein a typical bearing frequency array is created using the typical base frequency values. The create operation 804 is preferably in the form of a sub-routine call and will be discussed in more detail in reference to the embodiment in FIG. 10. Control then transfers to the create operation 806 wherein flux and slot arrays are created. The create operation 806 is preferably in the form of a sub-routine call and will be discussed in more detail in reference to the embodiment in FIG. 11. Control then transfers to the create operation 808 wherein typical electromagnetic frequency arrays are created. The create operation 808 is preferably in the form of a sub-routine call and will be discussed in more detail in reference to the embodiment in FIG. 13. Control then transfers to the create operation 810 wherein the disc drive arrays are created. The create operation 810 is preferably in the form of a sub-routine call and will be discussed in more detail in reference to the embodiment in FIGS. 15 & 16. Control then transfers to the return operation 812 wherein control is transferred back to the calling function.

Figure 9:
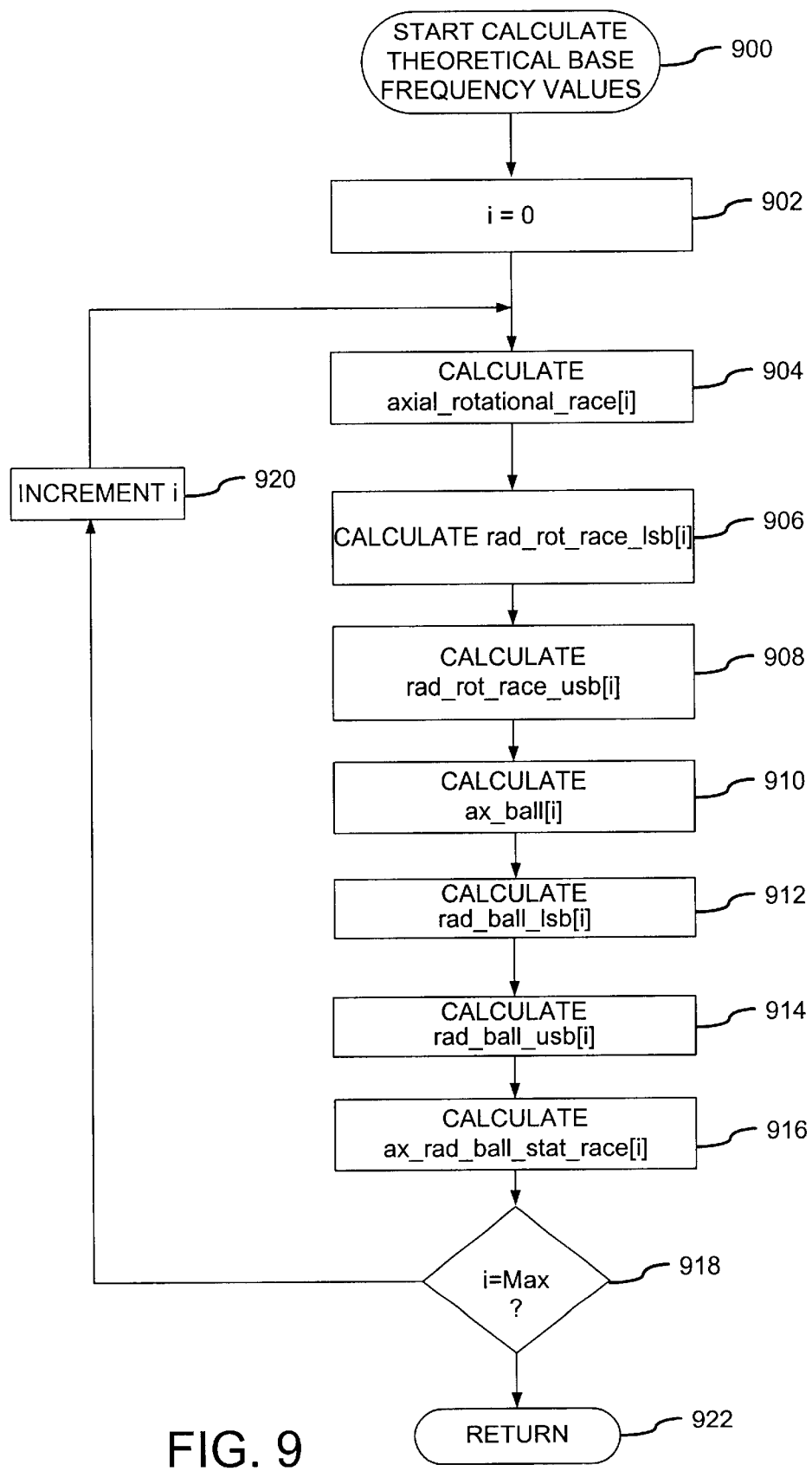

Turning now to FIG. 9 therein is shown a flow chart of the process of calculating typical base frequency values in accordance with the preferred embodiment of the present invention. The process illustrated in FIG. 9 is a process of generating a maximum number of base frequencies associated with a maximum number of harmonics. The theoretical base frequency values are then used to generate a maximum number of harmonics of a plurality of varying frequency types. The theoretical bearing frequencies generated using the base frequencies are frequencies at which it is expected to find peak magnitudes in a configuration file of disc drive frequency data.

In FIG. 9 control starts in the start operation 900 wherein initializing processing is performed. Control then transfers to the initializing operation 902 wherein the accounting variable is initialized to zero. Control then transfers to the calculating operation 904 wherein one of a maximum number of axial rotational race values is calculated. The value of the axial rotational race is a function of the harmonic and the train frequency. Control then transfers to the calculate operation 906 wherein a lower sideband value for the radial rotational race is calculated. The radial rotational race value is a function of the fundamental rotational frequency in a race in the axial rotational race value. Control then transfers to the calculate operation 908 wherein an upper sideband value for the radial rotational race is calculated. Control then transfers to the axial ball operation 910 wherein an axial ball value is calculated. The axial ball value is a function of the fundamental rotational frequency inner and outer race, and the harmonic. Control then transfers to the calculate operation 912 wherein a lower sideband value for a radial ball is calculated. Control then transfers to the calculate operation 914 wherein an upper sideband value is calculated for the radial ball. The radial ball values are a function of the axial ball value and the fundamental rotational frequency outer race. Control then transfers to the calculate operation 916 wherein an axial and radial ball stationary race value is calculated. The axial and radial ball stationary race value is a function of the harmonic and the fundamental rotational frequency outer race. The control then transfers to the determining operation 918 wherein it is determined whether the maximum number of harmonics has been reached. If the maximum number of harmonics has not been reached control transfers to the increment operation 920 wherein the counter value is incremented. If, on the other hand, the maximum number of harmonics has been reached, control transfers to the return operation 922 wherein control is transferred back to the calling routine.

Figure 10:
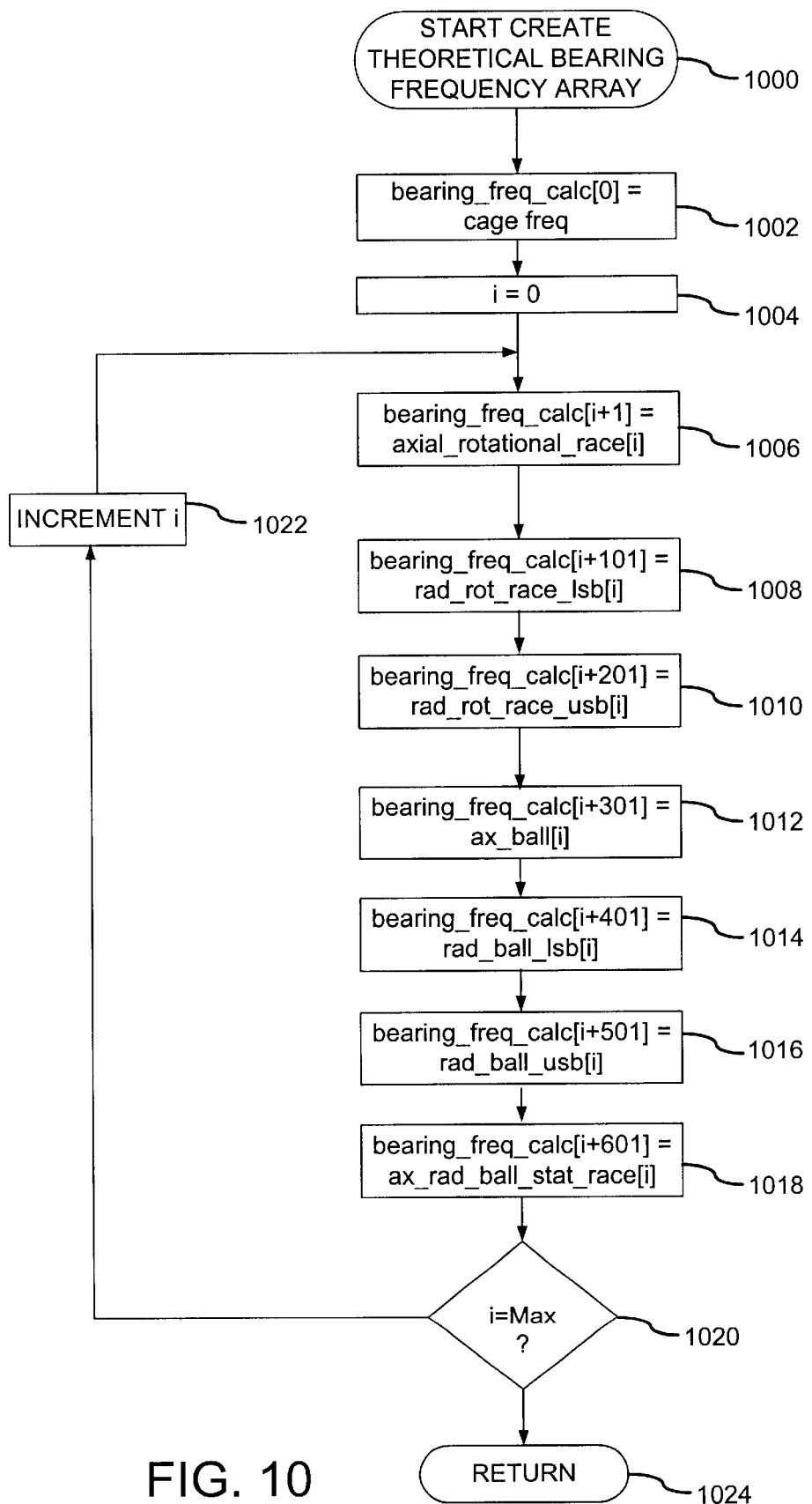

Referring now to FIG. 10 therein is a flow chart illustrating the process of creating a theoretical bearing frequency array values at a maximum of harmonics. As was mentioned earlier the theoretical bearing frequency values are used to locate peak magnitudes associated with frequencies in a configuration file of frequency disc drive data.

In FIG. 10 control starts with the start operation 1000 wherein initializing processing occurs. Control then transfers to the initializing operation 1002 wherein the cage frequency is stored as the zero element of the bearing frequency array. Control then transfers to the initializing operation 1004 wherein a counter variable is initialized to zero. After the initialization process a looping process is entered wherein an array of theoretical bearings is generated. In the exemplary embodiment shown in FIG. 10 the theoretical bearing frequency array is divided into groups, each group being associated with a different type of bearing frequency. In the exemplary embodiment of FIG. 10 there are 100 harmonics of each type of bearing frequency; however, in other embodiments a different number of harmonics could be used. The looping process depicted in the preferred embodiment in FIG. 10 groups one hundred of each type of bearing frequency into different sections of the bearing frequency array.

The looping process begins when control transfers from the initializing operation 1004 to the equaling operation 1006. In the equaling operation 1006 a frequency in the first group of theoretical bearing frequencies is set equal to an axial rotational race value calculated earlier. Control then transfers to the equaling operation 1008 wherein a frequency in a different section of the array is set equal to a radial rotational race lower sideband value calculated earlier. Control then transfers to the equaling operation 1010 wherein a frequency in another section of the theoretical bearing frequency array is set equal to an upper sideband value of the radial rotational race calculated earlier. Control then transfers to the equaling operation 1012 wherein a frequency in another section of the array is set equal to an axial ball value calculated earlier. Control then transfers to equaling operation 1014 wherein a frequency in another section is set equal to a radial ball lower sideband value calculated earlier. Control then transfers to the equaling operation 1016 wherein a frequency in another section of the array is set equal to a radial ball upper sideband value. Control then transfers to the equaling operation 1018 wherein a frequency of another section of the array is set equal to an axial and radial ball stationary race value calculated earlier. Control then transfers to the determining operation 1020 wherein it is determined whether the maximum number of harmonics has been reached. If it is determined that the maximum number of harmonics has not been reached control transfers to the incrementing operation 1022 wherein the counter variable is incremented. If it is determined that the maximum number of harmonics has been reached control transfers to the return operation 1024 wherein control is transferred back to the calling function.

Figure 11:
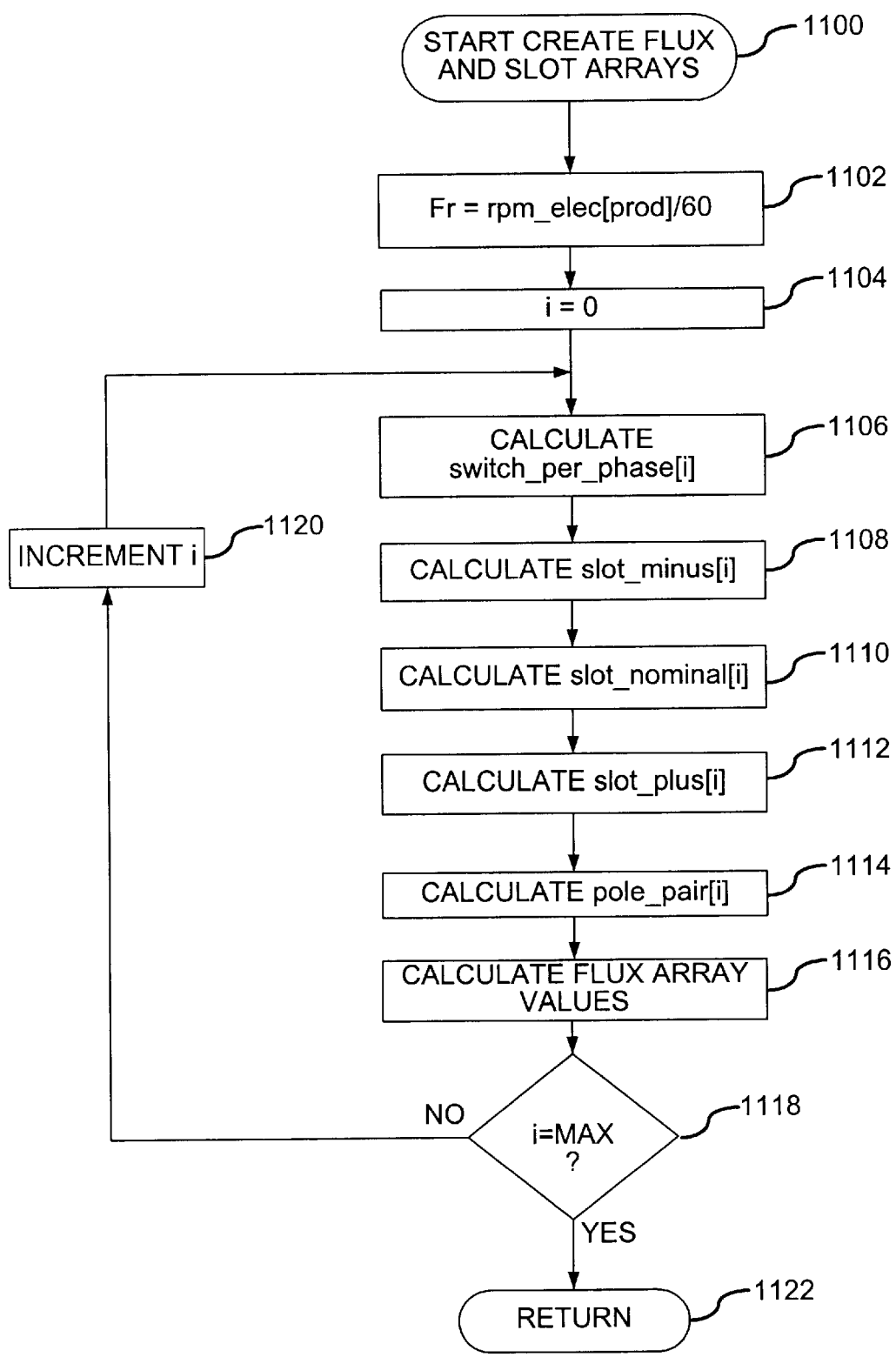

FIG. 11 is a flow chart illustrating a process of creating flux and slot arrays in an embodiment of the present invention. Flux and slot arrays are used to create electromagnetic frequency arrays. Flux relates to the magnetic flux generated by the magnets in the motor. Slots refer to the spaces or slots between the arrays of wire windings. A pole/slot configuration in the disc drive motor is what gives rise to characteristic electromagnetic frequencies. In the embodiment of FIG. 11, flux, slot, and pole values are calculated to represent the electromechanical characteristics of the disc drive 100. Flux, slot, and pole values are functions of electromechanical characteristics of the disc drive 100, and can be calculated using functions that are well known in the art.

In the embodiment shown in FIG. 11, processing starts at the start operation 1100, wherein initialization processing occurs. Control then transfers to the equalizing operation 1102 wherein a fundamental frequency is set equal to the disc drive revolutions per minute (RPM) divided by sixty seconds per minute. Thus the fundamental frequency in the equalizing operation 1102 is in a per seconds basis. Control then transfers to the initializing operation 1104 wherein a counting variable is set equal to zero. As will be discussed in more detail, a looping operation is then entered wherein a number of frequency values are calculated and stored in arrays. The array values are representative of a number of harmonics of a fundamental frequency.

Control transfers from the initializing operation 1104 to the calculate operation 1106. In the calculate operation 1106 a switch per phase value is calculated and stored in a switch per phase array. The switch per phase value represents switch frequency subharmonics, and is a function of the harmonic, the fundamental frequency, and the number of poles in the class of disc drives. Control then transfers to the calculate operation 1108 wherein a lower sideband slot frequency is calculated. Control then transfers to the calculate operation 1110 wherein a nominal slot frequency is calculated. Control then transfers to the calculate operation 1112 wherein an upper sideband slot frequency is calculated. The slot frequencies calculated in calculate operation 1108, calculate operation 1110, and calculate operation 1112, are typically a function of the harmonic, the fundamental frequency, the number of slots in the class of disc drive, and the number of poles in the class of disc drive. Control then transfers to the calculate operation 1114 wherein a pole pair value is calculated. Typically the pole pair value is a function of the harmonic, the fundamental frequency, and the number of poles in the class of disc drive.

Control then transfers to the calculate operation 1116 wherein a number of flux array values are calculated. In calculate operation 1116 preferably a number of flux arrays are created, wherein each flux array holds flux frequency values at a different harmonic of the fundamental frequency. Typically a flux frequency value is a function of a harmonic, a fundamental frequency, the number of poles in the class of disc drive, and the number of phases in the class of disc drives. After the flux array values are created in calculate operation 1116, control transfers to the determine operation 1118. In the determine operation 1118 it is asked whether a maximum number of harmonics has been reached. If the maximum number of harmonics has not been reached, control then transfers to the increment operation 1120. In the increment operation 1120 the counter value is incremented by one to advance to the next harmonic. After the counter variable is incremented in increment operation 1120, control loops back to calculate operation 1106, thus beginning another iteration of the array calculations at a higher harmonic. If, on the other hand, the maximum number of harmonics has been reached in the determine operation 1118, control transfers to the return operation 1122 wherein control is transferred back to the calling function.

Figure 12:
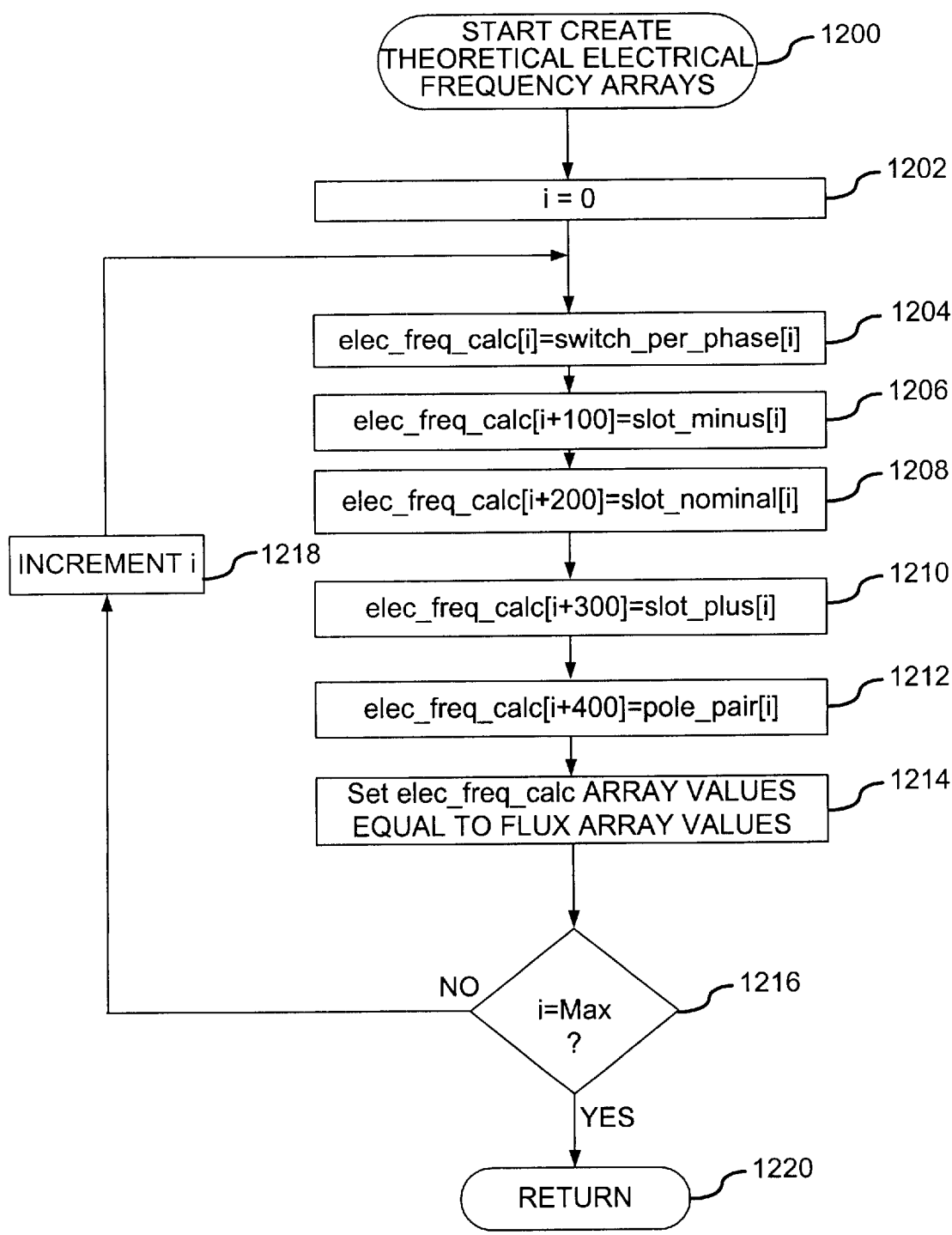

Turning now to FIG. 12, shown therein is a flowchart illustrating a process to create theoretical electromagnetic frequency arrays in accordance with a preferred embodiment of the present invention. Control initially transfers to the start operation 1200 wherein initialization processing occurs. Control then transfers to the initialization operation 1202 wherein a counter variable is initialized to zero. The counter variable represents a harmonic to be used in calculating theoretical frequencies and indexing an array. After the counter variable is initialized in the initializing operation 1202, control transfers the equalizing operation 1204. In the equalizing operation 1204 one of a set of electromagnetic frequency array values is set equal to a switch per phase value calculated as shown in the embodiment of FIG. 11.

Control then transfers to the equalizing operation 1206 wherein one of a second set of electromagnetic frequencies is set equal to a lower sideband slot frequency calculated as shown in FIG. 11. Control then transfers to the equalizing operation 1208 wherein one of a third set of electromagnetic frequencies is set equal to a nominal slot frequency calculated earlier. Control then transfers to the equalizing operation 1210 wherein one of a fourth set of electromagnetic frequencies is set equal to an upper sideband slot frequency calculated earlier. Control then transfers to the equalizing operation 1212 wherein one of a fifth set of electromagnetic frequencies is set equal to a pole pair value calculated earlier. Control then transfers to the equalizing operation 1214 wherein a number of electromagnetic frequency arrays are created using the flux array values calculated as shown in the embodiment of FIG. 11. In the preferred embodiment, the equalizing operation 1214 creates a set of electromagnetic frequency values for every harmonic of flux array values created with regard to the embodiment of FIG. 11. The electromagnetic frequency arrays contain electromagnetic frequency data associated with characteristics of the configuration of the test disc drive 100, such as magnet pole pairs, stator slots, and commutation.

Control then transfers to the determine operation 1216 wherein it is asked whether the maximum number of harmonics has been reached. If, in the determine operation 1216, the maximum number of harmonics has not been reached, control then transfers to the increment operation 1218 wherein the counter variable is incremented. After the increment operation 1218 control transfers back to the equalizing operation 1214 thus beginning another iteration at a higher harmonic. If, on the other hand, in the determine operation 1216 the maximum number of harmonics has been reached, control transfers to the return operation 1220 wherein control is transferred back to the calling function.

Figure 13:
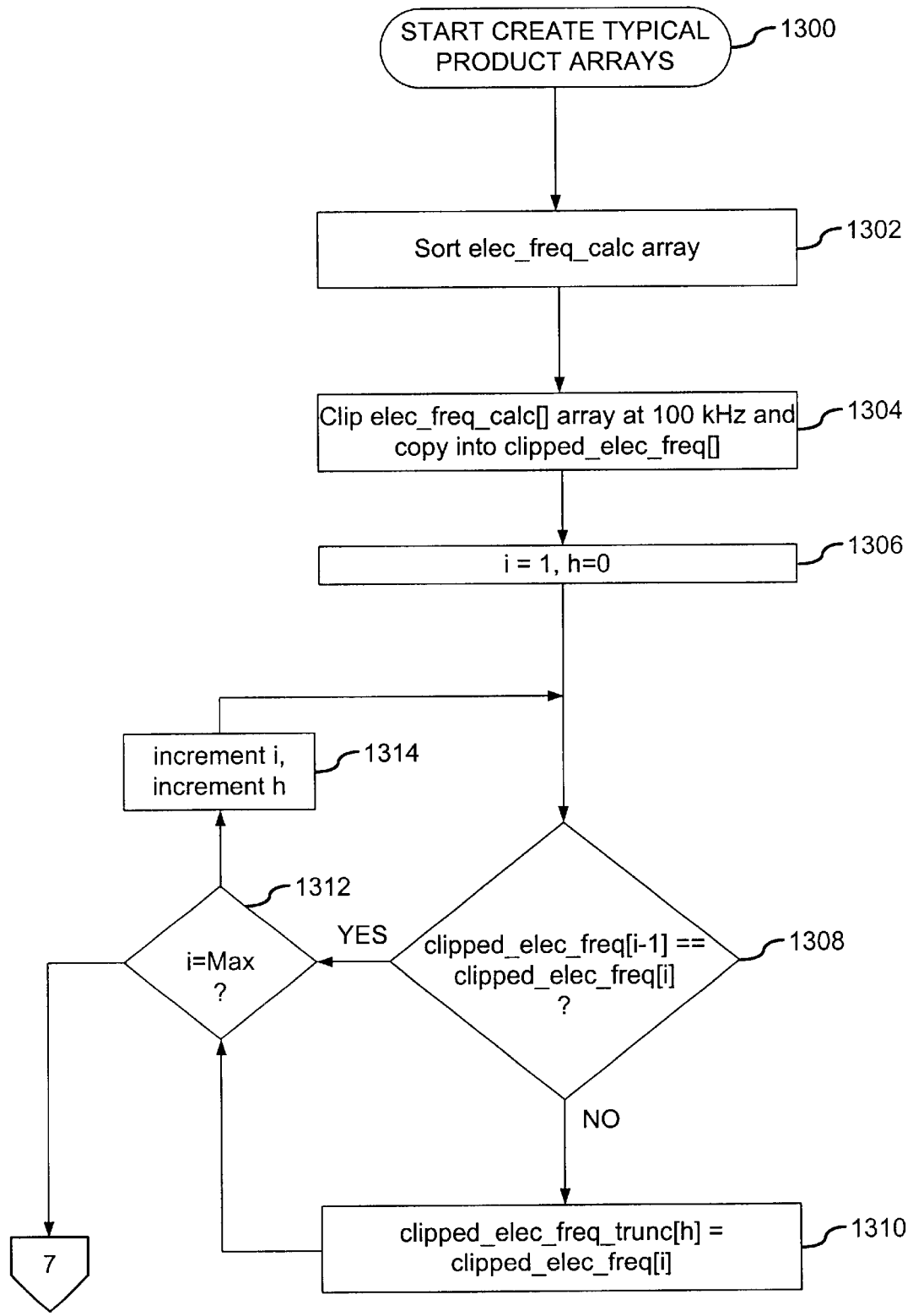
Figure 14:
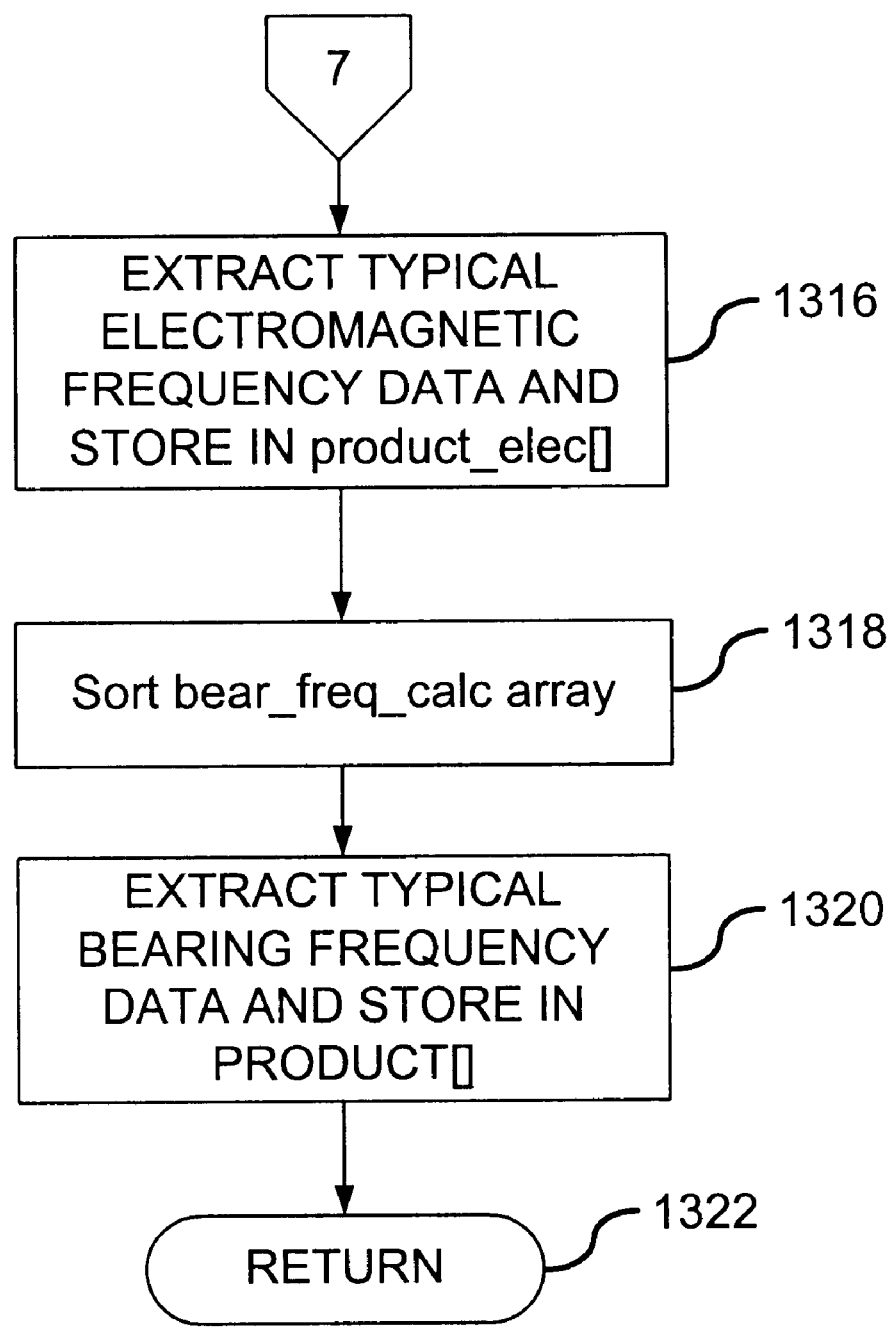

Referring now to FIGS. 13 and 14, therein is shown a flow chart illustrating a process of creating typical disc drive arrays in accordance with the preferred embodiment of the present invention. As will be discussed in more detail, the process shown in FIGS. 13 and 14 maps previously calculated theoretical frequencies into a set of typical frequencies located in a configuration file. A configuration file is preferably used to hold typical disc drive frequency data. The configuration file is associated with a class of disc drives and preferably contains mechanical signature analysis limit values associated with corresponding frequencies. For example, a disc drive having the name "Snowmass" may have an associated configuration file named "Snowmass.txt". Also, if the class of disc drives can have a number of configurations, a configuration file can be created for each configuration. The configuration file is preferably an ASCII text file, but can be in any computer readable format.

Turning to the embodiment shown in FIG. 13, control initially transfers to the start operation 1300 wherein initialization processing occurs. Control then transfers to the sort operation 1302 wherein previously calculated electromagnetic frequency array values are sorted. Control then transfers to the clip operation 1304 wherein electromagnetic frequency array values above 100 kilohertz are clipped, or removed, from the array and copied into a clipped electromagnetic frequency array. Control then transfers to the initializing operation 1306 wherein two counter variables are initialized. One counter variable is initialized to zero while another counter is initialized to one to facilitate removal of duplicate frequencies later in the process.

Control then transfers to the determining operation 1308 wherein it is determined whether a prior clipped electromagnetic frequency is equal to a subsequent clipped electromagnetic frequency. If not, control transfers to the equalizing operation 1310 wherein one of an array of truncated clipped electromagnetic frequencies is set equal to the subsequent clipped electromagnetic frequency. If, on the other hand, it is determined in the determining operation 1308 that a prior clipped electromagnetic frequency is equal to a subsequent clipped electromagnetic frequency, control transfers to the determining operation 1312. Control also transfers to the determining operation 1312 after the equalizing operation 1310. In the determining operation 1312 it is asked whether the maximum number of harmonics has been reached. If not, control transfers to the incrementing operation 1314 wherein both counter variables are incremented by one. After the incrementing operation 1314 control transfers back to the determining operation 1308. After the maximum number of harmonics is iterated through in the looping process of the determining operation 1308, the equalizing operation 1310, the determining operation 1312, and the incrementing operation 1314, the result is a set of sorted, truncated, clipped electromagnetic frequencies. The resultant set of clipped, sorted, truncated electromagnetic frequencies are theoretical frequencies that will be used to create a set of typical disc drive frequencies. As will be discussed in more detail, the theoretical frequencies facilitate identifying and extracting typical disc drive frequency values in the configuration file.

After the maximum number of harmonics has been reached in the determining operation 1312 the control transfers to the extracting operation 1316 shown in FIG. 14. In the extracting operation 1316 the frequency data at the theoretical frequencies is copied or extracted from the configuration file and stored in an array holding typical disc drive electromagnetic frequency data. After the extracting operation 1316 control transfers to the sorting operation 1318 wherein the previously created theoretical bearing frequency array is sorted. Control then transfers to the extracting operation 1320 wherein typical disc drive frequency data associated with frequencies identified by the sorted theoretical bearing frequencies is extracted from the configuration file and copied into a typical bearing disc drive array. Control then transfers to the return operation wherein control is transferred to the calling function.

In the preferred embodiment of FIGS. 13 and 14, typical disc drive electromagnetic frequencies are obtained before typical disc drive bearing frequencies; however, the order may be reversed in other embodiments. Typical disc drive electromagnetic frequencies and typical disc drive bearing frequencies are generally referred to as typical disc drive frequencies.

Figure 15:
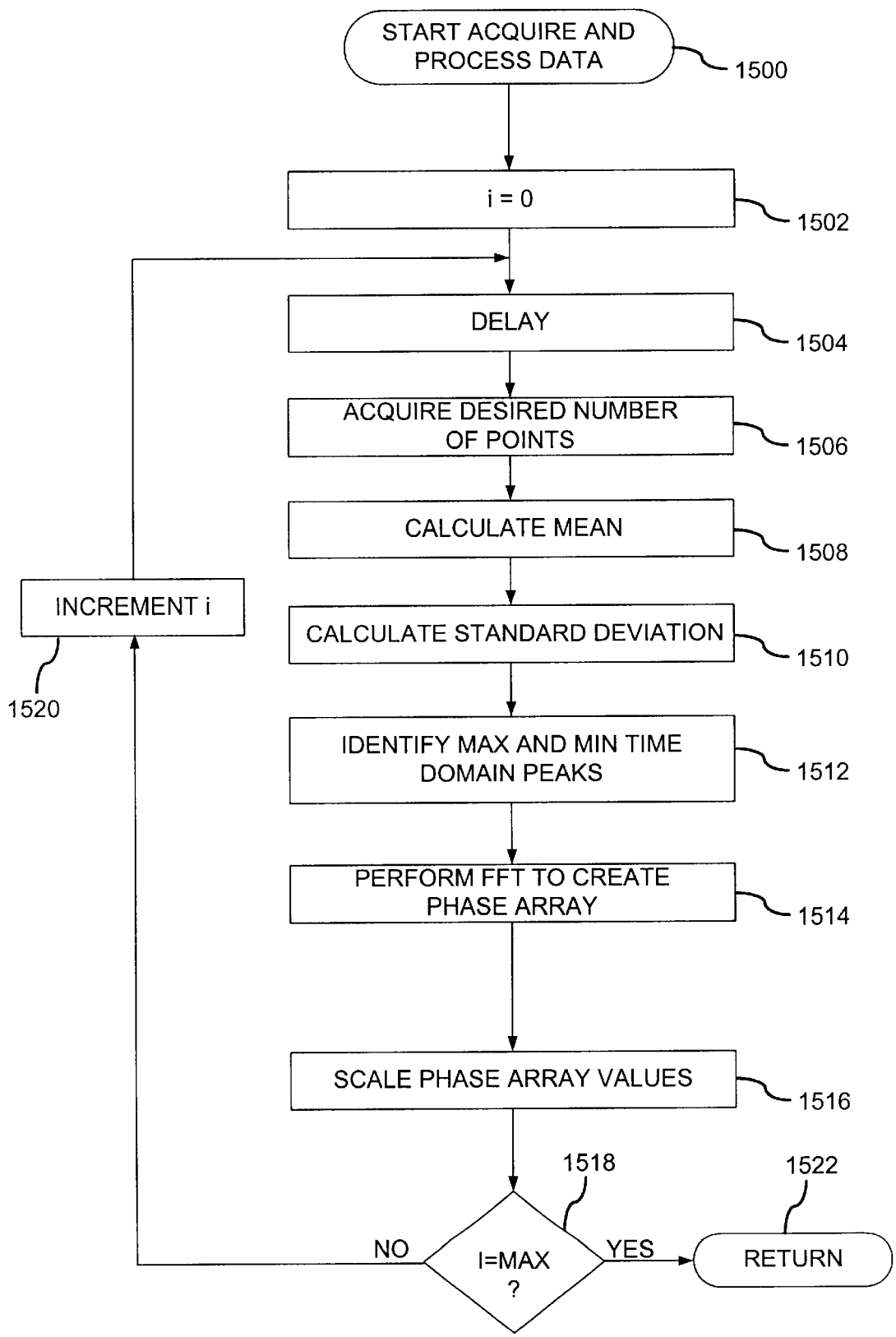
FIG. 15 is a flow chart of a data acquisition process in accordance with a preferred embodiment of the present invention.

Referring now to FIG. 15, therein is shown a flow chart illustrating the process of acquiring and converting test vibration data in accordance with a preferred embodiment of the present invention. Control initially transfers to the start operation 1500 wherein initializing processing occurs. Control then transfers to the initializing operation 1502 wherein a counter variable is initialized to zero. The counter variable counts a number of sets of sample vibration data. Each set of sample vibration data contains a number of time domain samples. Control then transfers to the delay operation 1504.

Beginning with the delay operation 1504, a looping process is entered wherein sets of sample test vibration data are repeatedly acquired and converted. The delay operation 1504 delays an arbitrary amount of time until continuing on with the sampling process. Delaying is typically done to help ensure statistical independence of samples, and the length of time of the delay is arbitrary. Control then transfers to the acquire operation 1506 wherein a desired number of time domain test samples are acquired. The acquiring operation 1506 is preferably in the form of a data acquisition module command commanding the data acquisition module to acquire the desired number of time domain test points. The acquiring operation 1506 typically also includes detecting vibrations, conditioning a time domain vibration signal, and filtering the time domain signal as shown in the test data acquisition module 302 of FIG. 4.

Control then transfers to the calculate operation 1508 wherein a mean is calculated from the acquired time domain test points. The mean is the average of the test magnitudes of the acquired test data. Control then transfers to the calculate operation 1510 wherein the standard deviation of the test magnitudes is calculated. Control then transfers to the identify operation 1512 wherein the minimum and maximum time domain peak magnitudes are identified. Control then transfers to the perform operation 1514 wherein a fast fourier transform (FFT) is performed on the time domain test data to create a phase array having frequency domain test data. The phase array typically consists of magnitude values at corresponding frequency indices.

Control then transfers to the scaling operation 1516 wherein the frequency domain test data of the phase array are scaled. Control then transfers to the determine operation 1518 wherein it is determined whether the maximum number of samples have been acquired. If not, control then transfers to the increment operation 1520 wherein the counter variable is incremented by one. After the counter variable is incremented, control is transferred back to the delay operation 1504, thus beginning another iteration through the acquisition and converting process. If, on the other hand, it is determined in the determining operation 1518 that the maximum number of samples have been acquired, control then transfers to the return operation 1522 wherein control is transferred back to the calling function.

Figure 16:
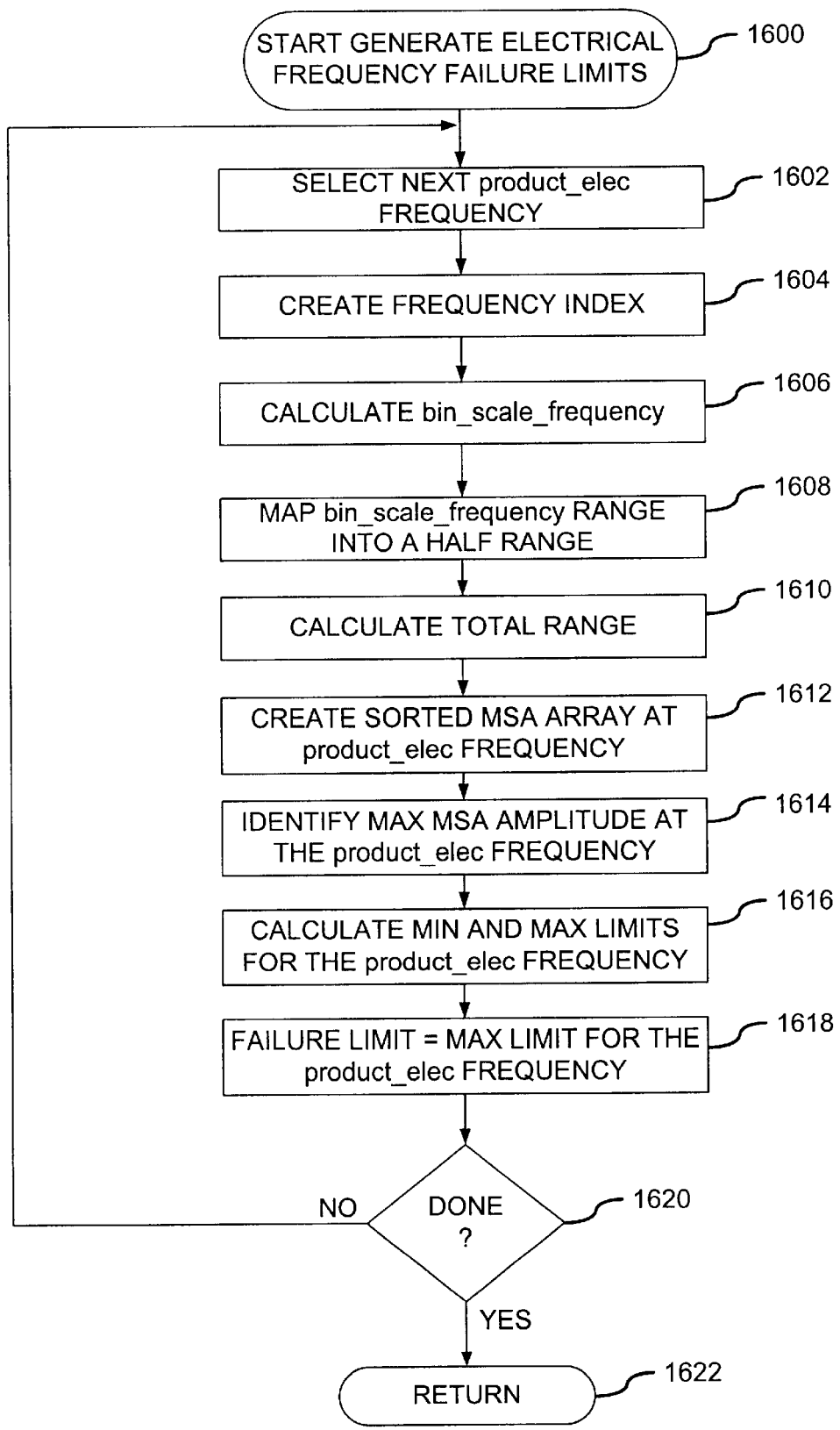
FIG. 16 is a flow chart of an electromagnetic frequency failure limit generation process in accordance with a preferred embodiment of the present invention.

Referring now to FIG. 16, shown therein is a flow chart illustrating a process of generating electromagnetic frequency failure limits in accordance with the preferred embodiment of the present invention. The embodiment in FIG. 16 depicts a looping process wherein each of the previously calculated typical disc drive electromagnetic frequencies is stepped through to identify an associated typical disc drive magnitude. Also, an array of magnitudes is created for each electromagnetic frequency. The values in the array are used to calculate failure limits associated with a typical disc drive frequency. The looping process shown in FIG. 16 is designed to identify peak magnitudes of electromagnetic frequencies for a typical disc drive in the class of disc drives of interest. Typically the process steps through a number of electromagnetic frequencies up to a predetermined maximum frequency.

In the embodiment of FIG. 16, control initially transfers to the start operation 1600 wherein initializing process occurs. Control then transfers to the select operation 1602 wherein the next typical disc drive electromagnetic frequency is selected. Control then transfers to the create operation 1604 wherein an index is created, which is a pointer to the calculated frequency. Control then transfers to the calculate operation 1606 wherein a rounded integer value of the frequency of interest is calculated. Control then transfers to the mapping operation 1608 wherein a half range value is determined based on the rounded integer frequency calculated in the calculate operation 1606. In the embodiment of FIG. 16 the half range value is half the range of frequencies around the frequency of interest. Typically, larger half range values are used for higher frequencies of interest. Associating greater half range values with higher frequencies ensures that on a percentage basis an equivalent range of frequencies is scanned for peak magnitudes at lower frequencies and higher frequencies. Control then transfers to the calculate operation 1610 wherein a total range value is calculated. The total range value is a function of the half range value.

Control then transfers to the create operation 1612 wherein an array of typical disc drive magnitudes across the total range of the typical disc drive frequency is created and sorted. Control then transfers to the identify operation 1614 wherein the maximum, or peak, typical disc drive magnitude for the typical disc drive frequency is identified. Control then transfers to the calculate operation 1616 wherein a minimum fail limit is calculated and a maximum fail limit is calculated using a typical disc drive template in a configuration file. Control then transfers to the equalizing operation 1618 wherein a failure limit is set equal to the maximum fail limit calculated in the calculate operation 1616.

Control then transfers to the determining operation 1620 wherein it is determined whether all of the predetermined frequencies have been stepped through. If not, control transfers back to the selecting operation 1602, thus beginning another iteration to generate electromagnetic failure limits for another typical disc drive electromagnetic frequency. If, on the other hand, all of the typical disc drive electromagnetic frequencies have been iterated through in the determining operation 1620, control then transfers to the return operation 1622 wherein control is transferred back to the calling function. To create failure limits for the typical disc drive bearing frequencies, the preferred embodiment uses the same process as that depicted in FIG. 16.

Figure 17:
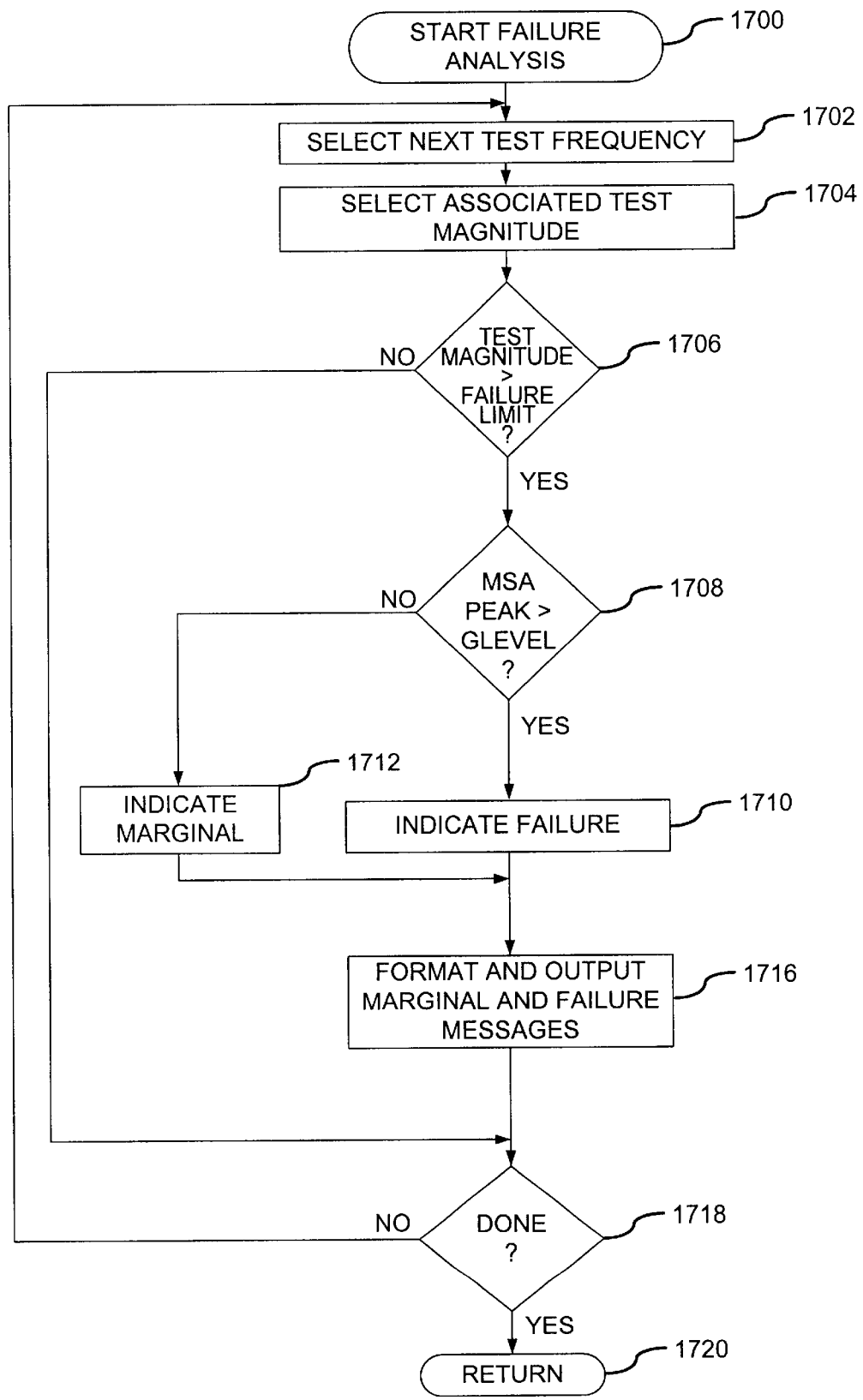
FIG. 17 is a flow chart of a frequency failure analysis process in accordance with a preferred embodiment of the present invention.

Referring now to FIG. 17, therein is shown a flow chart illustrating a process of analyzing test frequency data in accordance with a preferred embodiment of the present invention. The process shown in the embodiment of FIG. 17 can be used in analyzing both test bearing frequency data and test electromagnetic frequency data. The process steps of FIG. 17 identify test magnitudes that are excessive at associated test frequencies. As will be shown in more detail, the failure analysis process preferably yields one of a set of indicators.

Control initially transfers to the start operation 1700 wherein initializing processing occurs. Control then transfers to the select operation 1702 wherein a next test frequency is selected. Control then transfers to the select operation 1704 wherein an associated test magnitude is selected. The test magnitude is associated with the test frequency. Control then transfers to the determine operation 1706 wherein it is determined whether the test magnitude is greater than a failure limit. If so, control then transfers to the determine operation 1708 wherein it is determined whether the test magnitude is greater than a G-level. The G-level is an empirically determined minimum below which the signal has too little energy to be of concern. If the test magnitude is greater than the G-level, control then transfers to the indicate operation 1710 wherein a failure is indicated. If, on the other hand, the test magnitude is not greater than the G-level in the determine operation 1708, control then transfers to the indicate operation 1712 wherein a marginal status is indicated. Thus, marginal means that the test magnitude is greater than the failure limit but less than the G-level. From the indicate operations 1710 and 1712 control transfers to the format operation 1716 wherein the marginal and failure messages are formatted and output using the output module 308 of FIG. 3. These messages are preferably displayed on a monitor, such as monitor 291. Alternatively, failure analysis results can be written to a file in computer 210 and stored on a hard disc drive 100.

If, on the other hand, in the determining operation 1706 the test magnitude is not greater than the failure limit, control transfers to the determine operation 1718. Control also transfers to the determine operation 1718 after the format operation 1716. In the determine operation 1718, it is determined whether the process has iterated through all the typical frequencies. If not, control transfers back to the select operation 1702 wherein the next typical frequency is selected, thus beginning another iteration to analyze failure limits for another typical frequency. If, on the other hand, in the determine operation 1718 it is determined that all typical disc drive frequencies have been analyzed, control transfers to the return operation 1720 wherein control transfers back to the calling function. In the embodiment shown in FIG. 17, there is no indication given unless the test magnitude is marginal or fails. However, in other embodiments, a pass indicator or some other indication can be given when the test magnitude passes the failure analysis.

In summary, the present invention may be viewed as an apparatus (such as 300) for analyzing a mechanical signature of vibrations in a test disc drive (such as 100). The apparatus (such as 300) preferably has a failure analysis module (such as 306), a test data acquisition module (such as 302), and a typical disc drive data generator module (such as 304). The failure analysis module (such as 306) has failure limits associated with the typical disc drive frequency domain data (such as 430), determines whether the test data (such as 420) are within the failure limits, and generates failure analysis results. The failure analysis module (such as 306) is preferably connected to the test data acquisition module (such as 302), which acquires time domain test data (such as 408) from the test disc drive (such as 100). The failure analysis module (such as 306) is also preferably connected to the typical disc drive data generator module (such as 304), which has frequency domain data for a typical disc drive.

The mechanical signature analysis apparatus (such as 300) may also have an output module (such as 308) connected to the failure analysis module (such as 306). The output module (such as 308) preferably provides test magnitudes, test frequencies, typical magnitudes, typical frequencies, and failure analysis results from analysis of the frequency domain test data (such as 420) for vibrations in the test disc drive (such as 100).

The test data acquisition module (such as 302) preferably has a transducer (such as 406) fastened to an outside surface of the test disc drive (such as 100). The transducer (such as 406) detects vibrations within the operating test disc drive (such as 100) and generates a test data signal (such as 408). The test data acquisition module (such as 302) may also have a signal conditioner (such as 410) connected to the transducer (such as 406) to generate a conditioned signal. The test data acquisition module (such as 302) may also have a filter (such as 412) connected to the signal conditioner (such 410) to filter unwanted frequencies out of the conditioned signal and generate a filtered signal. The test data acquisition module (such as 302) may also have a data acquisition module (such as 404) connected to the filter (such as 412) to receive the filtered signal and convert the filtered signal into a digital signal. The test data acquisition module (such as 302) typically has a fast fourier transform module (such as 418) connected to the data acquisition module (such as 404) to perform a fast fourier transform on the digital signal to generate frequency domain test data (such as 420) corresponding to the vibrations in the test disc drive (such as 100).

The typical disc drive data module (304) preferably has a configuration file (such as 432), which has typical frequency data for a predetermined number of disc drives in a class of disc drives. The output module (such as 308) may output an identifier identifying each frequency as either a bearing frequency, an electromagnetic frequency, or another frequency. The typical disc drive data generator module (such as 304) preferably identifies each test frequency and each typical disc drive frequency as one of either a bearing frequency, an electromagnetic frequency, or an other frequency.

The failure analysis module (such as 306) preferably determines whether a test magnitude of a bearing frequency is within one or more failure limits corresponding to a typical magnitude of a typical disc drive bearing frequency. The failure analysis module (such as 306) preferably determines whether a test magnitude of an electromagnetic frequency is within one or more failure limits corresponding to a typical magnitude of a typical disc drive bearing frequency.

The typical disc drive data generator module (such as 304) preferably calculates theoretical frequencies (such as 426), which have peak magnitudes. The theoretical frequencies (such as 426) are preferably used to locate typical disc drive frequencies in a configuration file (such as 432) which has typical disc drive frequency data (such as 430) associated with corresponding classes of disc drives. The typical disc drive data (such as 430) preferably has average magnitudes at typical frequencies associated with a predetermined number of disc drives in a class of disc drives.

The present invention may also be viewed as a method of analyzing a test magnitude of a test frequency associated with one or more vibrations in an operating test disc drive (such as 100) with preferred steps of receiving (such as 516 and 1506) time domain test data (such as 408) from the operating test disc drive (such as 100), converting (such as 1514) the time domain test data (such as 408) into frequency domain test data (such as 420) having test frequencies with associated test magnitudes, comparing (such as 436, 1706, and 1708) the frequency domain test data (such as 420) with typical disc drive frequency domain data (such as 430), and determining (such as 436, 1706, and 1708) whether a test magnitude of an associated test frequency in the test data (such as 420) is within a predetermined limit associated with a typical magnitude of a corresponding typical disc drive frequency.

The method preferably has a step of outputting (such as 1712 and 1710) a fail indicator if the test magnitude is not within the predetermined limit. The step of receiving preferably includes steps of detecting (such as 1506) vibrations from the test disc drive (such as 100) with a transducer (such as 406) fastened to an outside surface of the test disc drive (such as 100), generating (such as 1506) a time domain test signal (such as 408) from the vibrations, generating (such as 1506) a conditioned test signal from the time domain test signal (such as 408), and filtering (such as 1506) from the conditioned test signal unwanted frequencies to produce a filtered test signal.

The step of converting (such as 418 and 1514) preferably includes performing (such as 1514) a fast fourier transform on the time domain test data. The step of comparing (such as 436) preferably includes obtaining (such as 1614, 1616, and 1618) an upper failure limit and a lower failure limit associated with typical magnitudes at a corresponding typical disc drive frequency, and comparing (such as 1706 and 1708) the test magnitude at a test frequency to a typical disc drive magnitude at a typical disc drive frequency. The determining (such as 436) step preferably includes steps of determining (such as 1706 and 1708) whether the test magnitude is greater than the upper failure limit, and determining whether the test magnitude is less than the lower failure limit.

The present invention may also be viewed as a method of determining (such as 422 and 428) a typical disc drive frequency used in analyzing vibrations in a test disc drive, wherein the method includes steps of calculating (such as 904–916, and 1106–1116) a theoretical disc drive frequency, which is a function of electromechanical characteristics of a predetermined class of disc drives of which the test disc drive (such as 100) is a member, using the theoretical disc drive frequency to search (such as 1316 and 1320) a configuration file (such as 432) of typical disc drive frequency data associated with the predetermined class of disc drives, and identifying (such as 1614) a peak magnitude within a predetermined range of frequencies around the theoretical frequency.

Calculating (such as 802) theoretical disc drive frequencies preferably includes calculating (such as 904) an axial rotational race frequency, calculating (such as 906 and 908) a radial rotational race frequency, calculating an axial ball frequency (such as 910), calculating a radial ball frequency (such as 912 and 914), and calculating an axial radial ball stationary race frequency (such as 916) of the class of disc drives. The calculating (802) step also includes steps of calculating (such as 1102–1120) a plurality of theoretical disc drive frequencies at a plurality of harmonics of a fundamental frequency.

The present invention may also be viewed as a computer program product readable by a computing system (such as 210) and encoding a computer program (such as 238) of instructions for executing a computer process for analyzing a test magnitude of a test frequency associated with one or more vibrations in an operating test disc drive (such as 100), wherein the computer process includes steps of receiving (such as 516 and 1506) time domain test data (such as 408) from the operating test disc drive (such as 100), converting (such as 1514) the time domain test data into frequency domain test data (such as 408), comparing (such as 436, 1706, and 1708) the frequency domain test data (such as 420) with typical disc drive frequency domain test data (such as 430), and determining (such as 436, 1706, and 1708) whether a test magnitude of an associated test frequency in the test data (such as 420) is within a predetermined limit associated with a typical magnitude of a corresponding typical disc drive frequency. The computer process preferably implements a step of outputting (such as 1712 and 1710) a fail indicator if the test magnitude is not within the predetermined limit.

The present invention may also be viewed as a mechanical signature analysis system (such as 300) for a disc drive (such as 100) having a test disc drive (such as 100), and a means (such as 302, 304, and 306) for analyzing vibrations in the disc drive.

The logical operations of the various embodiments of the present invention are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations making up the embodiments of the present invention described herein are referred to variously as operations, structural devices, acts or modules. It will be recognized by one skilled in the art that these operations, structural devices, acts and modules may be implemented in software, in firmware, in special purpose digital logic, and any combination thereof without deviating from the spirit and scope of the present invention as recited within the claims attached hereto.

It will be clear that the present invention is well adapted to attain the ends and advantages mentioned as well as those inherent therein. While a presently preferred embodiment has been described for purposes of this disclosure, various changes and modifications may be made which are well within the scope of the present invention. For example, the configuration file could contain other disc drive data, including ball bearing geometries and disc spin-speed. Also, the configuration file could be updateable using any updating means such as remotely over a network, or with a memory medium, such as a floppy disc, CD ROM, or a Personal Computer Memory Card International Association (PCMCIA) card. Also, the transducer may be fastened using other fastening means, including adhesive materials or tape. Numerous other changes may be made which will readily suggest themselves to those skilled in the art and which are encompassed in the spirit of the invention disclosed and as defined in the appended claims.

What is claimed is:

1. A mechanical signature analysis system for analyzing frequencies and magnitudes of vibrations in an operating test disc drive, the system comprising:
   a test data acquisition module connected to the test disc drive operable to acquire time domain test data from the test disc drive and convert the time domain test data into frequency domain test data;
   a disc drive data module having frequency domain data for a reference disc drive;
   a failure analysis module connected to the disc drive data module and the test data acquisition module, wherein the failure analysis module has failure limits associated with the reference disc drive frequency domain data and is operable to determine whether the test data are within the failure limits, and generate failure analysis results; and
   wherein the disc drive data module is operable to calculate theoretical frequencies having peak magnitudes for use in analyzing the frequency domain test data.

2. The system of claim 1 further comprising an output module connected to the failure analysis module, the output module operable to provide test magnitudes, test frequencies, reference magnitudes, reference frequencies, and failure analysis results from analysis of the frequency domain test data for vibrations in the test disc drive.

3. The system of claim 1 wherein the test data acquisition module comprises a transducer fastened to an outside surface of the test disc drive, the transducer being operable to detect the vibrations within the operating test disc drive and generate a test data signal.

4. The system of claim 3 wherein the test data acquisition module further comprises:
   a signal conditioner connected to the transducer operable to generate a conditioned signal having a plurality of frequencies;
   a filter connected to the signal conditioner to filter unwanted frequencies out of the conditioned signal and generate a filtered signal;
   a data acquisition module connected to the filter to receive the filtered signal and convert the filtered signal into a digital signal; and
   a fast fourier transform module connected to the data acquisition module operable to perform a fast fourier transform on the digital signal to generate frequency domain test data corresponding to the vibrations in the test disc drive.

5. The system of claim 1 wherein the disc drive data module comprises a configuration file having reference frequency data for a predetermined number of disc drives in a class of disc drives.

6. The system of claim 2 wherein the output module is operable to output an identifier identifying each frequency as either a bearing frequency, an electromagnetic frequency, or another frequency.

7. The system of claim 1 wherein the disc drive data module is operable to identify each test frequency and each reference disc drive frequency as one of either a bearing frequency, an electromagnetic frequency, or an other frequency.

8. The system of claim 7 wherein the failure analysis module is operable to determine whether a test magnitude of a bearing frequency is within predetermined limits corresponding to a reference magnitude of a reference disc drive bearing frequency.

9. The system of claim 7 wherein the failure analysis module is operable to determine whether a test magnitude of an electromagnetic frequency is within predetermined limits corresponding to a reference magnitude of a reference disc drive bearing frequency.

10. The system of claim 1 wherein the theoretical frequencies are used to locate reference disc drive frequencies in a configuration file having reference disc drive frequency data associated with corresponding classes of disc drives.

11. The system of claim 10 wherein the reference disc drive data comprises average magnitudes at reference frequencies associated with a predetermined number of disc drives in a class of disc drives.

12. A method of analyzing a test magnitude of a test frequency associated with one or more vibrations in an operating test disc drive comprising steps of:
   (a) receiving time domain test data from the operating test disc drive;
   (b) converting the time domain test data into frequency domain test data having test frequencies with associated test magnitudes;
   (c) comparing the frequency domain test data with theoretical disc drive frequency domain data calculated based on characteristics of the test disc drive; and
   (d) determining whether a test magnitude of an associated test frequency in the test data is within a predetermined limit.

13. The method of claim 12 further comprising steps of:
   (e) outputting a fail indicator if the test magnitude is not within the predetermined limit.

14. The method of claim 12 wherein the receiving step (a) comprises:
   (a)(1) detecting vibrations from the test disc drive with a transducer fastened to an outside surface of the test disc drive;
   (a)(2) generating a time domain test signal from the vibrations;
   (a)(3) generating a conditioned test signal from the time domain test signal; and
   (a)(4) filtering from the conditioned test signal unwanted frequencies to produce a filtered test signal.

15. The method of claim 12 wherein the converting step (b) comprises performing a fast fourier transform on the time domain test data.

16. The method of claim 12 wherein the comparing step (c) comprises:
- (c)(1) obtaining an upper failure limit and a lower failure limit associated with reference magnitudes at a corresponding typical disc drive frequency; and
- (c)(2) comparing the test magnitude at a test frequency to a reference disc drive magnitude at a typical disc drive frequency.

17. The method of claim 12 wherein the determining step (d) comprises:
- (d)(1) determining whether the test magnitude is greater than the upper failure limit; and
- (d)(2) determining whether the test magnitude is less than the lower failure limit.

18. A method of determining a reference disc drive frequency used in analyzing vibrations in a test disc drive, the method comprising steps of:
- (a) calculating a theoretical disc drive frequency, the theoretical disc drive frequency being a function of electromechanical characteristics of a predetermined class of disc drives of which the test disc drive is a member;
- (b) searching a configuration file of reference disc drive frequency data associated with the predetermined class of disc drives, using the theoretical disc drive frequency; and
- (c) identifying a peak magnitude within a predetermined range of frequencies around the theoretical frequency, the peak magnitude corresponding to the reference disc drive frequency.

19. The method of claim 18 wherein the theoretical disc drive frequency is an axial rotational race frequency of the class of disc drive.

20. The method of claim 18 wherein the theoretical disc drive frequency is a radial rotational race frequency of the class of disc drive.

21. The method of claim 18 wherein the theoretical disc drive frequency is an axial ball frequency of the class of disc drives.

22. The method of claim 18 wherein the theoretical disc drive frequency is a radial ball frequency of the class of disc drives.

23. The method of claim 18 wherein the theoretical disc drive frequency is an axial radial ball stationary race frequency of the class of disc drives.

24. The method of claim 18 wherein the calculating step (a) comprises steps of:
- (a)(1) calculating a plurality of theoretical disc drive frequencies at a plurality of harmonics of a fundamental frequency.

25. A computer program product readable by a computing system and encoding a computer program of instructions for executing a computer process for analyzing a test magnitude of a test frequency associated with one or more vibrations in an operating test disc drive, the computer process comprising steps of:
- (a) receiving time domain test data from the operating test disc drive;
- (b) converting the time domain test data into frequency domain test data having test frequencies with associated test magnitudes;
- (c) comparing the frequency domain test data with theoretical disc drive frequency domain data calculated based on characteristics of the test disc drive; and
- (d) determining whether a test magnitude of an associated test frequency in the test data is within a predetermined limit.

26. The computer program product of claim 25 wherein the computer process further comprises steps of:
- (e) outputting a fail indicator if the test magnitude is not within the predetermined limit.

27. A disc drive mechanical signature analysis system comprising:
- a test disc drive;
- a reference disc drive data module having frequency domain data for a reference disc drive and operable to calculate theoretical frequencies having peak magnitudes, the theoretical frequencies being used to locate reference disc drive frequencies in a configuration file having reference disc drive frequency data associated with corresponding classes of disc drives; and
- means for analyzing vibrations in the disc drive comprising a transducer fastened to an outside surface of the test disc drive, the transducer being operable to detect the vibrations within the operating test disc drive and generate a test data signal.

28. The mechanical signature analysis system of claim 27, further comprising:
- a test data acquisition module connected to the test disc drive operable to acquire time domain test data from the test disc drive and convert the time domain test data into frequency domain test data; and
- a failure analysis module connected to the reference disc drive data module and the test data acquisition module, wherein the failure analysis module has failure limits associated with the reference disc drive frequency domain data and is operable to determine whether the test data are within the failure limits, and generate failure analysis results.

29. The mechanical signature analysis system of claim 28 wherein the reference disc drive data module comprises the configuration file having reference frequency data for a predetermined number of disc drives in a class of disc drives.

30. A mechanical signature analysis system for analyzing frequencies and magnitudes of vibrations in an operating test disc drive, the system comprising:
- a test data acquisition module connected to the test disc drive operable to acquire time domain test data from the test disc drive and convert the time domain test data into frequency domain test data;
- a disc drive data module having frequency domain data for a reference disc drive;
- a failure analysis module connected to the disc drive data module and the test data acquisition module, wherein the failure analysis module has failure limits associated with the reference disc drive frequency domain data and is operable to determine whether the test data are within the failure limits, and generate failure analysis results; and
- wherein the disc drive data module is operable to calculate theoretical frequencies having peak magnitudes, the theoretical frequencies being used to locate reference disc drive frequencies in a configuration file having reference disc drive frequency data associated with corresponding classes of disc drives.

31. The system of claim 30 wherein the reference disc drive data comprises average magnitudes at reference frequencies associated with a predetermined number of disc drives in a class of disc drives.

* * * * *